Feb. 4, 1964     E. G. HUDAK     3,120,312
METHOD AND APPARATUS FOR HANDLING MATERIAL
Filed Oct. 5, 1961     8 Sheets-Sheet 1

INVENTOR.
EDWARD G. HUDAK
BY Williams, David,
Hoffmann & Yount
ATTORNEYS

INVENTOR.
BY EDWARD G. HUDAK
*Williams, David,
Hoffmann & Yount*
ATTORNEYS

INVENTOR
EDWARD G. HUDAK
BY Williams, David,
Hoffmann & Fount
ATTORNEYS

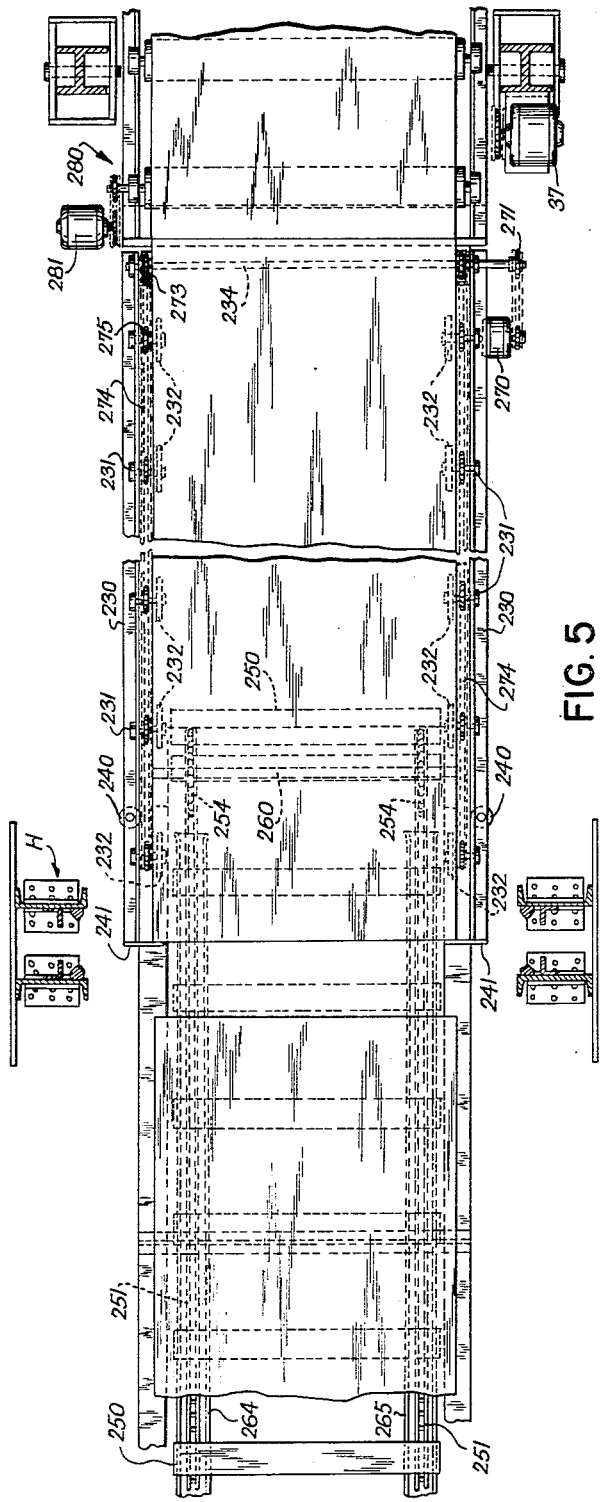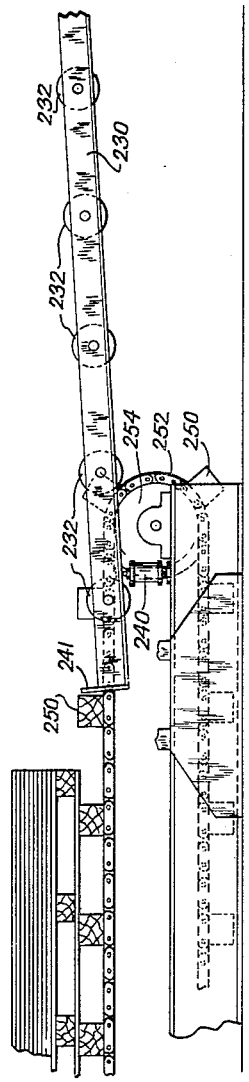

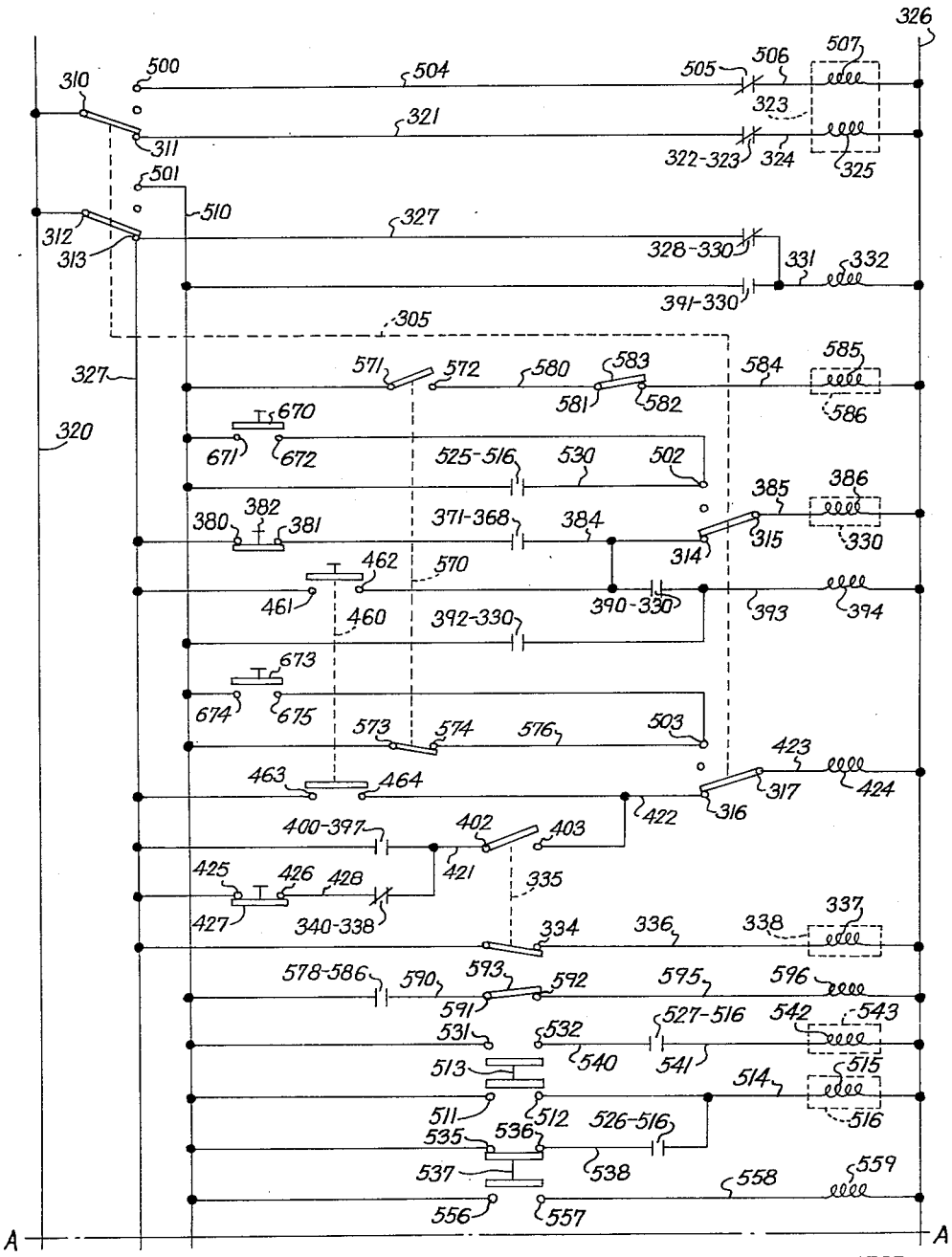
FIG. 8ᵃ

United States Patent Office 3,120,312
Patented Feb. 4, 1964

3,120,312
METHOD AND APPARATUS FOR HANDLING MATERIAL
Edward G. Hudak, Painesville Township, Lake County, Ohio, assignor to The Coe Manufacturing Company, Painesville, Ohio, a corporation of Ohio
Filed Oct. 5, 1961, Ser. No. 143,152
20 Claims. (Cl. 214—6)

The present invention relates to methods and apparatus for handling material and is particularly useful when applied to the stacking and/or unstacking of sheet-like material, especially when handled on pallets.

This application is a continuation-in-part of my copending application Serial No. 828,239, filed July 20, 1959.

The principal object of the present invention is the provision of a new and improved method and apparatus for stacking and/or unstacking material, preferably palletized material, that is material handled on pallets, which is rapid in operation and which minimizes manual operations.

A further object of the invention is the provision of a new and improved apparatus for loading and/or unloading pallets in which the operations of the component parts of the apparatus are automatically controlled and the pallets to be loaded and/or unloaded are automatically moved into and/or out of loading and unloading position in timed relation with the operation of the other parts of the apparatus.

A further object of the invention is the provision of a new and improved apparatus for placing articles on pallets or removing articles from pallets which include a conveyor, means for supporting a pallet in loading or unloading position adjacent to one end of the conveyor, means for operating the conveyor to move articles thereon, means for raising and lowering the end of the conveyor adjacent to the pallet support in a generally vertical direction, means for sensing the presence of articles on a pallet in loading or unloading position, means responsive to the sensing means to raise or lower the conveyor, depending upon whether pallets are being loaded or unloaded, and means for moving a pallet which is in loading or unloading position from that position and another pallet into that position and returning the conveyor to starting position upon the pallet being loaded or unloaded, as the case may be.

A further object of the invention is the provision of a new and improved apparatus for stacking articles, preferably on pallets, which comprises a conveyor for feeding articles to a pallet in loading position adjacent the discharge end of the conveyor, means for raising the end of the conveyor adjacent to the pallet, means for counting the articles delivered to the pallet, means actuated by the counting means to lower the end of the conveyor adjacent the pallet, means to move the pallet having a stack thereon from the loading position adjacent to the discharge end of the conveyor, and means to move an empty pallet into the loading position adjacent to the discharge end of the conveyor.

A still further object of the present invention is the provision of a new and improved apparatus for unstacking articles, preferably a stack located on a pallet, which comprises a conveyor for feeding articles from a pallet in unstacking position adjacent the end of the conveyor which receives the articles, means for engaging the articles on the stack on the pallet and moving the articles onto the conveyor, means for lowering the receiving end of the conveyor as the stack lowers, and means for removing the pallet after the stack of articles has been removed therefrom.

Further objects and advantages of the present invention will be apparent from the following description of the preferred embodiment described with reference to the accompanying drawings, in which;

FIG. 5 is a fragmentary sectional view approximately on the line 5—5 of FIG. 2;

FIG. 6 is a fragmentary enlarged side elevational view of the apparatus shown in FIG. 2 with the empty pallet conveyor in its unstacking position;

FIG. 8a, 8b are a wiring diagram of the electrical equipment and circuits utilized in the apparatus of FIG. 2.

Figure 1:
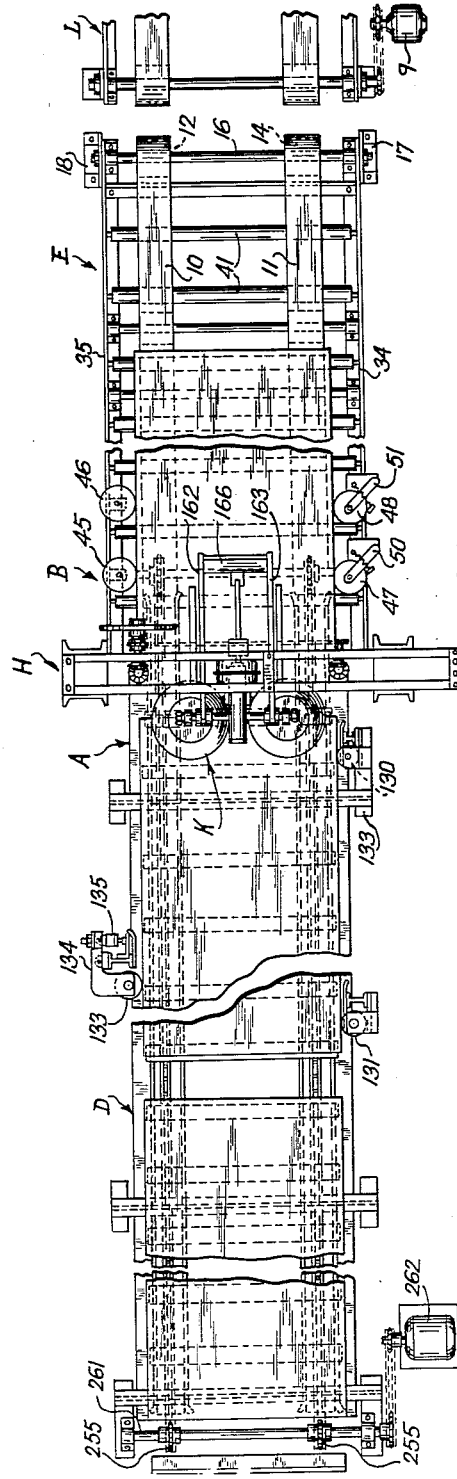
FIG. 1 is a plan view with parts removed of an apparatus embodying the present invention.

The present invention is shown on the drawings as preferably embodied in a pallet loader and unloader having mechanism for moving pallets into and out of loading or unloading position and articles to or from a pallet located in loading or unloading position depending upon whether the pallet is being loaded or unloaded. The pallet moving mechanism includes an empty pallet transfer means C for feeding empty pallets which are to be loaded or for removing pallets which have been unloaded to or from the loading and unloading position and a loaded pallet transfer means D for removing loaded pallets from the loading position or for delivering loaded pallets to the unloading position depending on whether the pallets are being loaded or unloaded. The article conveying means, termed herein after a tipple, includes tipple conveyor means E having one end pivotally mounted in a support F and the other end vertically movable by mechanism G mounted on an end frame assembly H of the tipple. The mechanism G is controlled so that during stacking or pallet loading the end of conveyor E adjacent the pallet is raised as the height of the stack of articles on the pallet increases, and during unstacking or pallet unloading the end of the conveyor E adjacent to the pallet being unloaded is lowered as the height of the stack of articles on the pallet is lowered.

The unloading of a pallet is effected by a reciprocable article engaging mechanism K which is mounted on the tipple frame assembly H and vertically movable with the movable end of conveyor E. The article engaging mechanism K is reciprocable in a generally horizontal direction and moves to engage the top article of the stack on the pallet being unloaded, grip it, and move it into position where it can be conveyed from the machine by conveyor E. When the pallet is unloaded it is removed from the unloading position and conveyed away by the empty pallet conveyor C to a storage area. Pallet loading is effected by the feeding or projecting of articles off the vertically movable end of the conveyor E and onto a pallet located in loading position. After a pallet has been loaded it is moved from loading position by conveyor D and an empty pallet moved into loading position by conveyor C. A conveyor L, shown on FIG. 1, located in alignment with conveyor E, moves the articles being stacked or unstacked in tandem relation to or from the tipple conveyor E depending upon whether the apparatus is loading or unloading pallets. The conveyor L is driven by a reversible electric motor 9. The various components of the machine are controlled by electrical and hydraulic systems, as described hereinbelow, in a manner to effectively time the operations of the various elements of the machine and to eliminate manual operation.

The tipple conveyor E comprises two endless belts 10, 11 reeved about pairs of pulleys 12, 13 and 14, 15, respectively, located adjacent to the opposite ends of the tipple. The pulleys 12, 14 are keyed to a transversely extending shaft 16, the opposite ends of which are rotatably supported by suitable bearings in the upper ends of the vertically positioned standards 17, 18, the former of which is clearly shown in FIG. 2 of the drawings. The lower ends of the standards 17, 18 are pivotally connected to brackets 20 fixedly secured to the floor of the factory in which the apparatus is housed, or to the base of the apparatus, if a separate base is employed. The pulley wheels 13, 15 are fixed to a transversely extending shaft 22 located adjacent to the left-hand end of the tipple, which shaft is rotatably supported by suitable bearings attached to vertically positioned side plates 25, 26 supported for vertical movement in adjacent side columns 27, 28 of an end frame assembly H of the tipple.

In addition to the side columns 27, 28 the end frame assembly H comprises a crown 30 connected to the upper ends of the side columns 27, 28, and a pair of base plates 32, 33 which maintain the frame assembly in vertical position. The frame assembly H, including the side columns 27, 28 is built up of commercial structural steel shapes and the particular construction forms no part of the present invention. The side plates 25, 26 are guided for vertical linear movement along the side columns 27, 28, respectively, by grooved wheels rotatably supported upon stud shafts fixed to the side plates and adapted to travel along vertical inverted V-like tracks on the inside front and rear sides of each of the side columns.

The shafts 16, 22 which carry the pulleys about which the belts 10, 11 are reeved are held in predetermined spaced relation by side frame members of the tipple conveyor E in the form of angle irons 34, 35, the opposite ends of which are rotatably connected to the shafts 16, 22. The side plates 25, 26 and in turn the shaft 22 and the ends of the angle irons 34, 35 adjacent thereto which move in a vertical plane, cause the standards 17, 18 to oscillate about their pivotal connections with the brackets 20, but this movement is not sufficient to interfere with the movement of articles to or from the belts 10, 11 and the conveyor L. The belts 10, 11 are adapted to be driven in a suitable direction by a reversible electric motor 37 on a bracket 38 connected to the near standard 17. The motor 37 is connected to and drives the shaft 16 through a flexible drive designated generally by the reference character 40. The upper reaches of the belts 10, 11 are supported intermediate the pulleys 12, 13 and 14, 15 by suitable rollers 41 spaced longitudinally therealong at desired intervals, the ends of which are connected to bearing brackets 42, which brackets are in turn connected to the upstanding flanges of the side frame members 34, 35. The lower reaches of the belts 10, 11 are looped about longitudinally spaced pairs of pulleys 43, 44, the right-hand pair 44 of which is adjustable lengthwise of the tipple conveyor E for the purpose of taking up slack which might occur in the belts during operation, etc.

Pairs of wheels or rollers 45, 46 and 47, 48 are supported for rotation about vertical axes adjacent to opposite sides of the tipple conveyor E near the left-hand end as viewed in FIG. 1, to align articles moving therebetween along the tipple conveyor E preparatory to their being formed into a stack if they are not properly aligned or positioned as they approach the left-hand end of the tipple conveyor. Alternatively the wheels or rollers 45—48 align articles transferred from a stack to the tipple conveyor E. The wheels 45, 46 on the far side of the tipple conveyor, as viewed in FIG. 1, are fixed to the far side frame member 35 and the wheels 47, 48 on the near side are connected to the free ends of levers 50, 51 connected to brackets 52, 53 fixed to the upstanding flange of the near side frame member 34. The levers 50, 51 on the near side of the tipple conveyor are pivoted to brackets 52, 53 for rotation about vertical axes and are spring biased towards the center line of the tipple conveyor and push the articles against the wheels 45, 46 at the other side of the conveyor as the articles pass therebetween. This aligns the articles with the direction of travel of the belts 10, 11 if, for any reason, they are not properly aligned as they pass through the left-hand end of the tipple conveyor E.

The side plates 25, 26 of the tipple conveyor E and in turn the end of the tipple conveyor adjacent a pallet in position to be loaded or unloaded are supported and moved vertically with respect to the end frame assembly F by the mechanism G which includes a vertically positioned pressure fluid operated double acting reciprocating type motor M, preferably one operated by air pressure. The motor M comprises a cylinder 63 connected by brackets 64, 65 to the outside of the side columns 28 of the end frame assembly H. The lower end of a piston rod 66 of the motor is connected to a piston 67. From the piston 67 the piston rod projects vertically upwardly through the upper cylinder head of the motor where its upper end is connected to a bracket or member 68 having a pair of sprocket wheels 70, 71 rotatably connected to a shaft 72 projecting through aligned holes in the member 68.

The sprocket wheels 70, 71 are operatively connected to the side plates 25, 26 of the tipple conveyor by sprocket chains 73, 74, respectively. One end of the sprocket chain 73 is fixedly connected to a member 75 secured to the top of the right-hand projecting ends of the channel members forming the crown 30, as the apparatus is viewed in FIG. 3, and after being reeved about the sprocket wheel 70, passes over a sprocket wheel 76 rotatably supported in the top of the right-hand column 28. From the sprocket wheel 76, the sprocket chain 73 passes over a sprocket wheel 77, similar to the sprocket wheel 76, but located adjacent to the left-hand end of the crown 30 or side of the end frame assembly F, as viewed in FIG. 3. From the sprocket wheel 77, the sprocket chain 73 passes downwardly within the left-hand column 27 and the lower end thereof is adjustably connected to a bracket secured to the end plate 25 and projecting into the adjacent column 27.

The sprocket chain 74 is fixedly connected to the crown 30 in a manner similar to that in which the sprocket chain 73 is connected thereto and after passing the sprocket wheel 71, passes over a sprocket wheel 78, similar to the sprocket wheel 76 and supported coaxially therewith. From the sprocket wheel 78, the sprocket chain 74 extends downwardly within the column 28, where it is adjustably connected to the side plate 26 by a bracket projecting into the column 28 in a manner similar to that in which the sprocket chain 73 is connected to the opposite side plate 25 of the tipple conveyor.

The vertically movable end of the tipple conveyor E is counterweighted in a suitable manner as by adjustable counterweights 81, 82 located within the columns 27, 28 and connected by sprocket chains 83, 84 to the adjacent side plates 25, 26, respectively. From the counterweights 81, 82 the sprocket chains 83, 84 pass over sprocket wheels 85, 86 rotatably supported in the upper ends of the columns. Other types and any suitable number of counterweight mechanisms could be used for this purpose.

Figure 7:
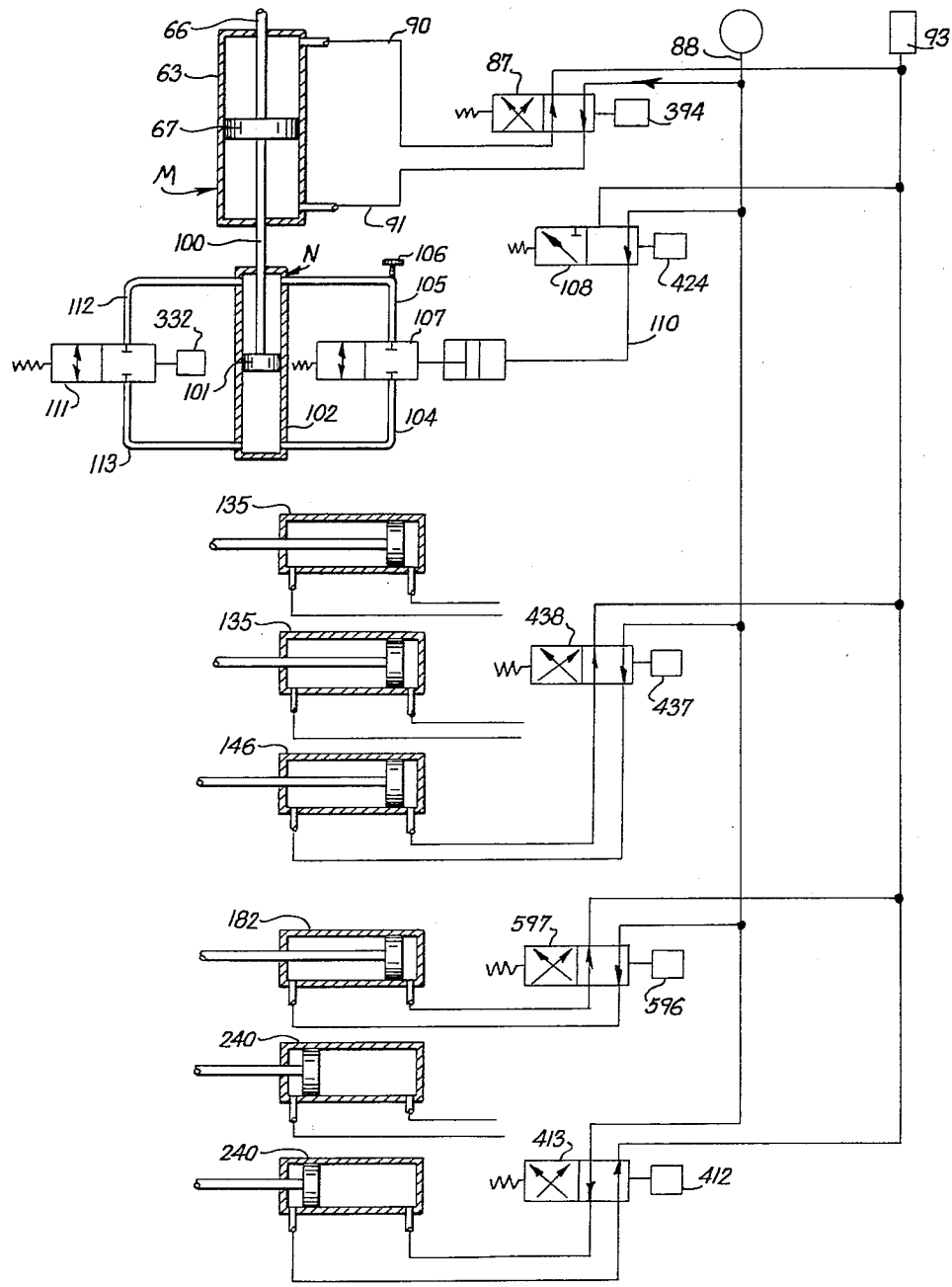
FIG. 7 is a schematic diagram of the fluid pressure equipment utilized in the apparatus of FIG. 2.
Figure 8B:
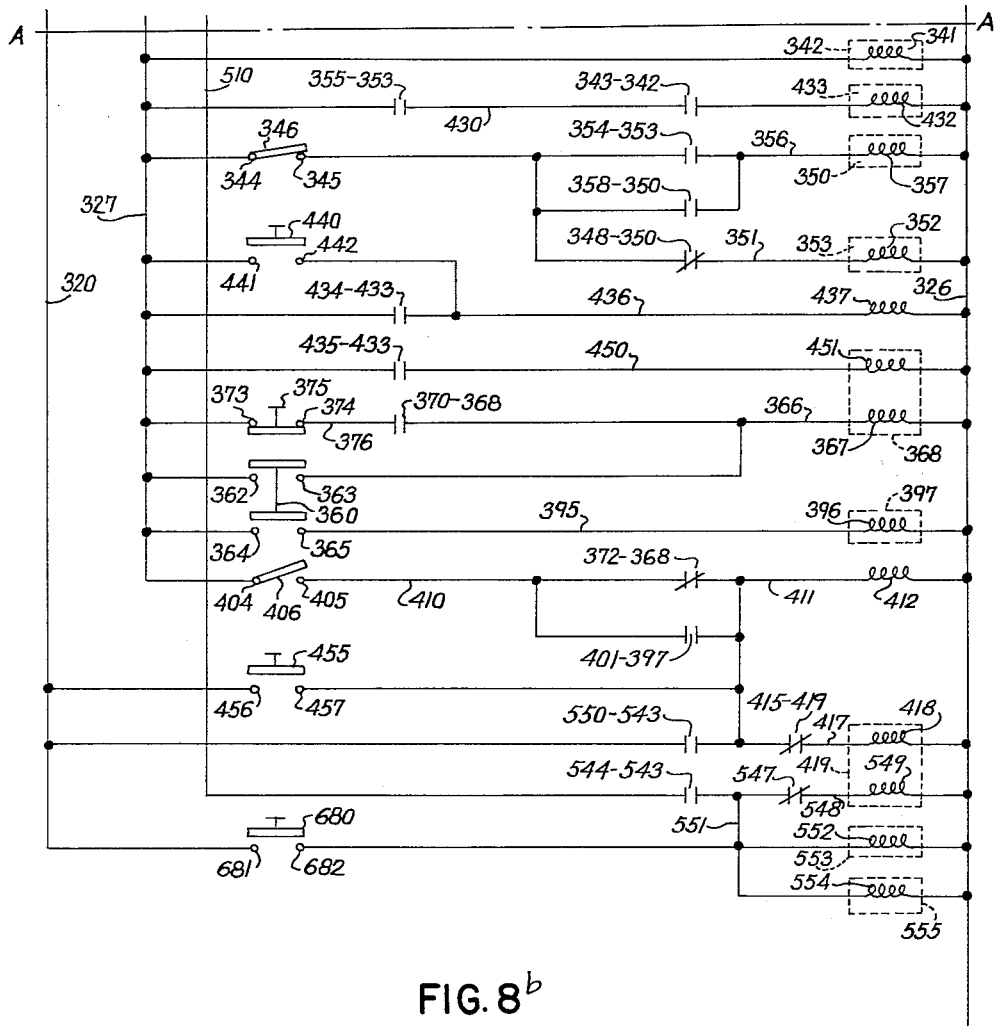

The motor M is of the double acting type and the flow of air to and from opposite ends thereof is controlled by a solenoid operated two position four-way valve 87 (see FIG. 7) connected to an air supply 88 and to opposite ends of the motor by conduits 90, 91. The valve 87 is spring biased to its position in which the air supply 88 is connected with the top of the motor M and the lower end of the motor is connected to atmosphere by way of a conduit 92 and a muffler 93. When the solenoid of the valve is energized the connections are reversed and are then positioned as shown in FIG. 7.

The motor M is provided with a second piston rod 100 projecting from the side of the piston 67 opposite the side from which the rod 66 projects and through the opposite end of the motor from that through which the piston rod 66 projects. The piston rod 100 is connected to a piston 101 slidably supported in a cylinder 102 fixedly connected to the lower end of the motor M and in alignment therewith. The cylinder 102 constitutes a part of a control motor or mechanism N for the motor M and together with conduit means 104, 105 communicating with opposite ends of the cylinder 102 forms a closed system filled with hydraulic fluid. The rate of flow of hydraulic fluid from one end of the cylinder 102 to the other is controlled by a needle valve designated generally by the reference character 106 and a pressure fluid operated two position valve 107 normally spring biased to its open position. The valves 106, 107 are in the conduit means 104, 105. The valve 107 is pressure operated to its closed position by air supplied by a two-position solenoid operated valve 108 connected thereto by a conduit 110. The valve 108 is spring biased to connect the conduit 110 to the air supply 88 and when the solenoid is energized the valve is shifted to close off the air supply and connect the conduit 110 with the atmosphere.

From the foregoing it will be apparent that when the solenoid of the valve 108 is de-energized the valve 107 will be closed and prevent the flow of hydraulic fluid from one end of the cylinder 102 to the other. This stops or prevents movement of the piston 101 and in turn vertical movement of the tipple conveyor E, even though one end or the other of the cylinder 63 of the motor M may be under air pressure. When it is desired to quickly move the tipple conveyor from one position to another, a solenoid operated normally closed bypass valve 111 located in conduit means 112, 113 connecting opposite ends of the cylinder 102 can be opened to permit relatively free flow of oil from one end of the cylinder 102 to the other. When the apparatus is in operation and articles are being placed on or removed from a pallet the speed of the vertical movement of the tipple conveyor E is controlled by the setting of the needle valve 106 and is preferably such that it moves at a rate to correspond with the rate that the height of the stack of articles on the pallet grows or diminishes depending upon whether the pallet is being loaded or unloaded.

When articles are being stacked the first article to pass over the discharge or left-hand end of the tipple conveyor E and be received upon a pallet is aligned on the pallet and both the pallet and article squared, and the subsequent articles delivered to the stack being formed are similarly aligned and squared with the stack. In the embodiment shown this is accomplished by three vertically standing rollers 130, 131, 132 and a pusher mechanism designated generally by P. The rollers 130, 131 are at the near side of the pallet, as viewed in FIG. 1, and are rotatably supported in the frame 133 of the conveyor D in a suitable manner. The third roller 132 is at the far side of the conveyor D and is carried in a cradle-like frame or carriage 134 pivotally connected to an I-beam of the frame 133 for oscillation about a vertical axis. The cradle is oscillated about its vertical axis to move the roller 132 toward and away from the rollers 130, 131 by two air operated motors 135, one of which is located adjacent to each end of the cradle. The rollers 130, 131, 132 are adjacent to the end of the conveyor D which is adjacent to the tipple frame assembly H and when the air operated motors 135 are actuated to swing the roller 132 towards the rollers 130, 131 the pallet and any articles previously delivered to the pallet are pushed against the rollers 130, 131 which are fixedly secured in the frame of the machine. The articles are thus aligned transversely of the conveyor.

Figure 3:
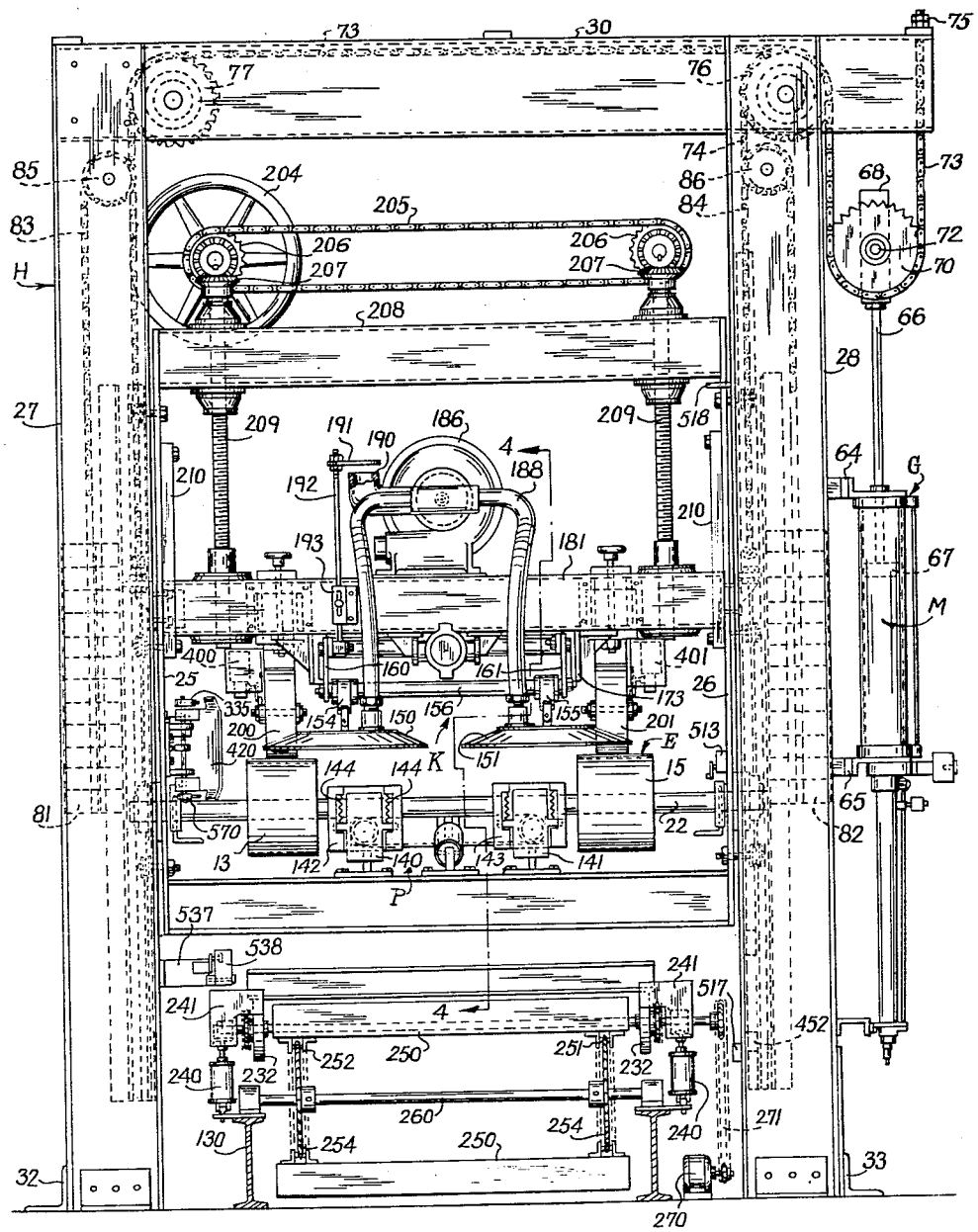
FIG. 3 is an elevational view of the tipple portion of the apparatus shown in FIGS. 1 and 2 looking towards the right and illustrating the pallet conveying mechanism located beneath the tipple.

Pallets delivered to conveyor D and the articles delivered to the pallets are aligned lengthwise by the pusher mechanism P comprising horizontally spaced, vertically positioned abutment plates 140, 141, slidably mounted for limited vertical movement on base plates 142, 143 and yieldably biased to their lower extended position by springs 144 shown in FIG. 3. The abutment plates 140, 141 function to engage the pallet and the first article fed to the pallet to align them lengthwise of their direction of travel through the apparatus. The plates 140, 141, as they are lowered with the conveyor E may strike the top of a pallet being moved into position to be loaded. In this event the action of springs allow the plates to slide relative to their respective base plates 142, 143 into a raised position.

Figure 4:
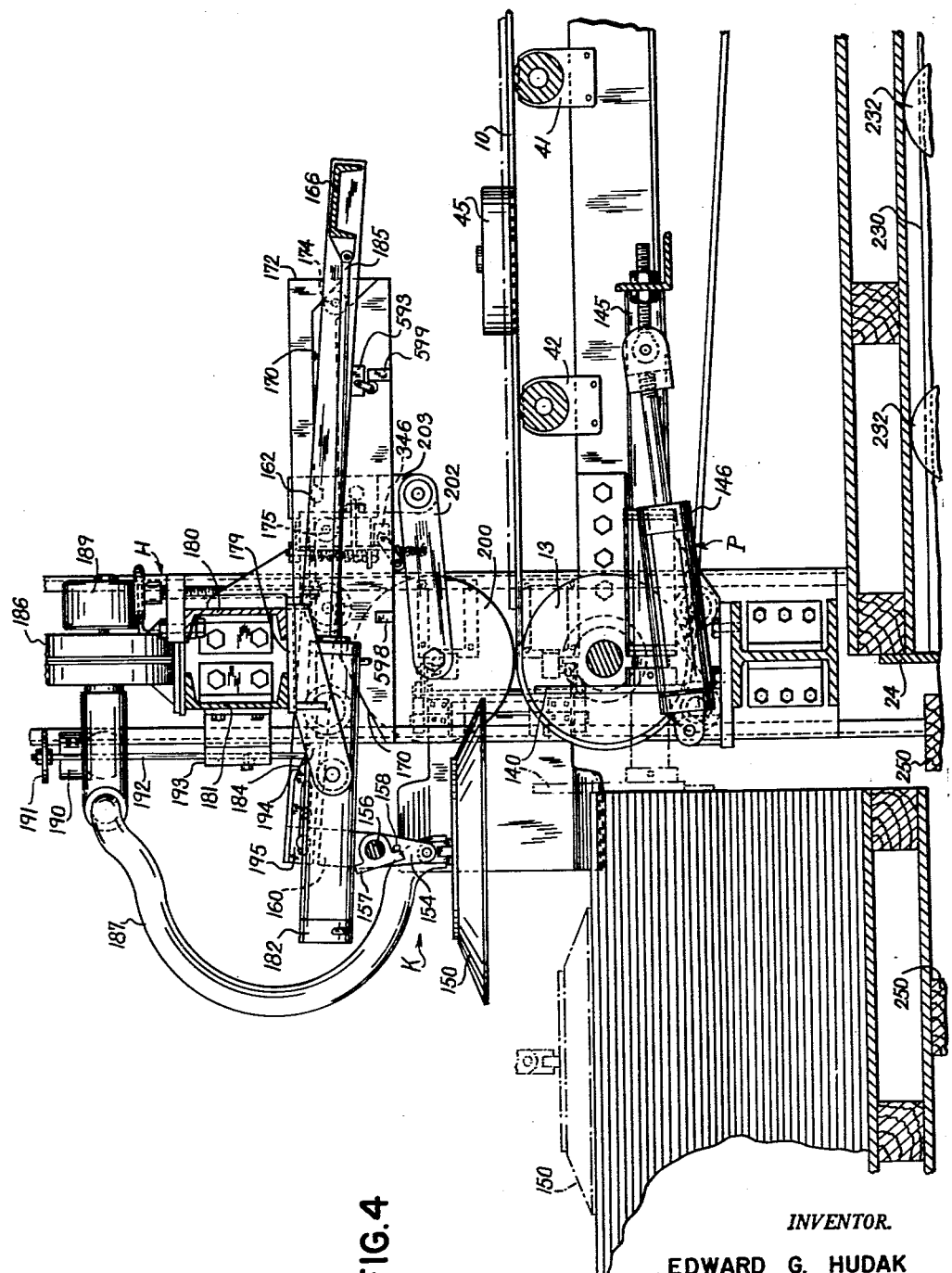
FIG. 4 is an enlarged sectional view approximately on the line 4—4 of FIG. 3.

When the pallet passes the abutment plates 140, 141 the springs will urge the plates 140, 141 down behind the pallet. The base plates 142, 143 are connected to the left hand end of carriage 145 slidably supported at the left-hand end of the tipple conveyor E and adapted to be reciprocated by a double acting fluid pressure motor 46. The pusher mechanism P is located between the belts 10, 11 of the tipple conveyor E and below the top reaches thereof. When the pusher carriage 145 is in its extended position the plates 140, 141 are slightly to the left of the end of the tipple conveyor E and the tipple frame H, as shown in the dot-dash lines in FIG. 4, and when it is in its retracted position the plates are to the right of the left-hand ends of the conveyor belts 10, 11, that is, in a position where they do not interfere with the movement of articles to or from the pallet. Upon actuation of the motor 146 to advance the carriage 145, the plates 140, 141 always advance to the same position and thus align the first board of the stack and the pallet and align the right-hand ends of the subsequent articles engaged thereby with the end of the first article and the pallet.

As previously mentioned, the present invention contemplates the unstacking of articles as well as the stacking of articles and the preferred embodiment shown is capable of doing either. To this end the cycle of operation of the tipple conveyor elevating and lowering mechanism including the power and control motors M and N is reversible, and the left-hand end of the tipple conveyor E as viewed in FIG. 1 is provided with the article engaging mechanism K for lifting articles from a stack of articles adjacent the conveyor E, one at a time, and delivering them to the conveyor belts 10, 11, which belts, it will be understood, are then operating in a direction to move the articles onto the conveyor L.

The article engaging mechanism K comprises a pair of relatively large vacuum cups 150, 151 connected by suitable universal connections to the lower end of bracket members 154, 155 journalled upon a transversely extending horizontal shaft 156 between stop members 157 of which there is one on each side of each of the bracket members 154, 155. Movement of the bracket members 154, 155 about the shaft 156 is limited by pins 158 carried by the respective bracket member and adapted to engage abutments on the stops 157. The abutments on the stops 157 limit rotation of the members 154, 155 in a counterclockwise direction to a position in which they are generally vertical when the vacuum cups carried thereby are engaged with the top article on the pallet. The other abutments on the stops 157 are approximately 180° from those justmentioned and limit the clockwise rotation of the arms 154.

The shaft 156 is fixedly secured in the lower ends of members 160, 161, the upper ends of which are connected to projecting ends of generally horizontal arms 162, 163, best seen in FIG. 1, reciprocably supported in the left-hand end of the tipple conveyor E above the belts 10, 11 for movement generally lengthwise of the tipple conveyor. The right-hand ends of the arms 162, 163 are connected together by a transverse member 166. The arms 162, 163 are reciprocably supported in inwardly facing grooves or tracks 170 in longitudinally extending members 172, 173 by pairs of rollers 174, 175 connected thereto adjacent to their right-hand ends and approximately at their mid points, respectively. Opposite ends of the tracks 170 are inclined downwardly with the result that the left-hand or projecting ends of the arms 162, 163 and in turn the vacuum cups carried thereby are abruptly raised and lowered as they approach the right- and left-hand ends of their travel. Through the major part of its movement the arms 162, 163 move in a generally horizontal path.

The track members 172, 173 are connected by suitable brackets to a plate 179 connected to the underside of two channel members 180, 181 extending across the tipple conveyor above the belts 10, 11 and adjustably connected to opposite side plates 25, 26. The arms 162, 163 are reciprocated by a double acting reciprocating type fluid pressure motor 182, the cylinder of which is pivotally connected to a bracket 184 connected to the plate 179 and the piston rod 185 of the motor is connected to a bracket fixed to the cross member 166 connecting the right-hand ends of the arms 162, 163.

Suction is created in the vacuum cups 150, 151 for the purpose of picking up the right-hand end of the top article on the pallet being unloaded by a motor driven vacuum pump 186 supported on the upper side of the channel members 180, 181 and connected to the suction cups 150, 151, by conduits 187, 188, respectively. The suction pump 186 is driven continuously by an electric motor 189 and the vacuum in the conduits leading to the vacuum cups is controlled by the opening and closing of a third conduit 190 connected to the vacuum pump. The open end of the conduit 190 is adapted to be opened and closed by a disk-like plate or valve 191 connected to the upper end of a rod 192 slidably supported in a member 193 connected to the channel member 181 and having its lower end in position to be engaged and lifted by a cam surface 194 on a member 195 adjustably connected to the left-hand end of the arm 162 as it approaches its retracted position.

The cross members 180, 181 also carry a pair of wheels 200, 201 above and spring biased towards the belts 10, 11 with sufficient force to grip articles fed between the wheels and the belts. The articles when being unstacked are placed between the wheels 200, 201 and belts 10, 11 are gripped thereby and fed away from the stack. The wheels 200, 201 are connected to the free left-hand ends of levers 202, the right-hand ends of which are pivotally connected to brackets 203 clamped to the right hand cross members 180 so that they may be adjusted transversely of the tipple. The articles as they are being stacked move along the tipple conveyor E, pass underneath and are engaged by the wheels 200 and 201.

The cross members 180, 181 and the article engaging mechanism K carried thereby can be raised and lowered with respect to the tipple conveyor belts 10, 11. This movement or adjustment is accomplished by rotation of a handwheel 204 through sprocket chain 205 meshing with spaced sprockets 206 and suitable bevel gearing arrangements 207 supported on a pair of beam members 208 extending between and fixedly secured to the spaced plates 25, 26, causing spaced threaded rods 209 to rotate. The rods 209 are rotatably secured to the beam members 208 and have threaded engagement with suitable nut members fixed between the cross members 180, 181 which are in turn slidably supported in guideways 210 secured to the plates 25, 26. Thus it is apparent that rotation of handwheel 204 causes the article engaging mechanism K to be adjusted with respect to the conveyor belts 10, 11.

The empty pallet conveyor C is located under the tipple conveyor E and includes a pair of spaced, channel shaped, beam members 230. Each of the beam members has a plurality of spaced stud shafts 231 rotatably mounted therein, each of which has mounted thereon a conventional roller 232 having magnetic clutches (not shown) in its hub. The rollers 232 are adapted to engage and convey empty pallets and the rollers mounted on one beam member 230 are spaced from the rollers mounted on the other beam member a sufficient distance to engage only the opposite outside edges of the pallets being conveyed. When the pallets are being conveyed for loading the rollers 232 function as idlers.

The channel beam members 230 are pivotally supported in a suitable manner at their end remote from the tipple end frame assembly H by a shaft 234 which is supported at its opposite ends by support members 235 which in turn are preferably suitably secured to the floor of the building in which the machine is being used. The ends of the members 230 adjacent the tipple frame assembly H are supported by air cylinders 240. Actuation of the air cylinders 240 causes the members 230 to pivot about their connection to the support members 235. The extreme ends of members 230 adjacent the tipple frame assembly H carry pallet stops 241 adapted to engage and hold a pallet in position on the conveyor C.

Figure 2:
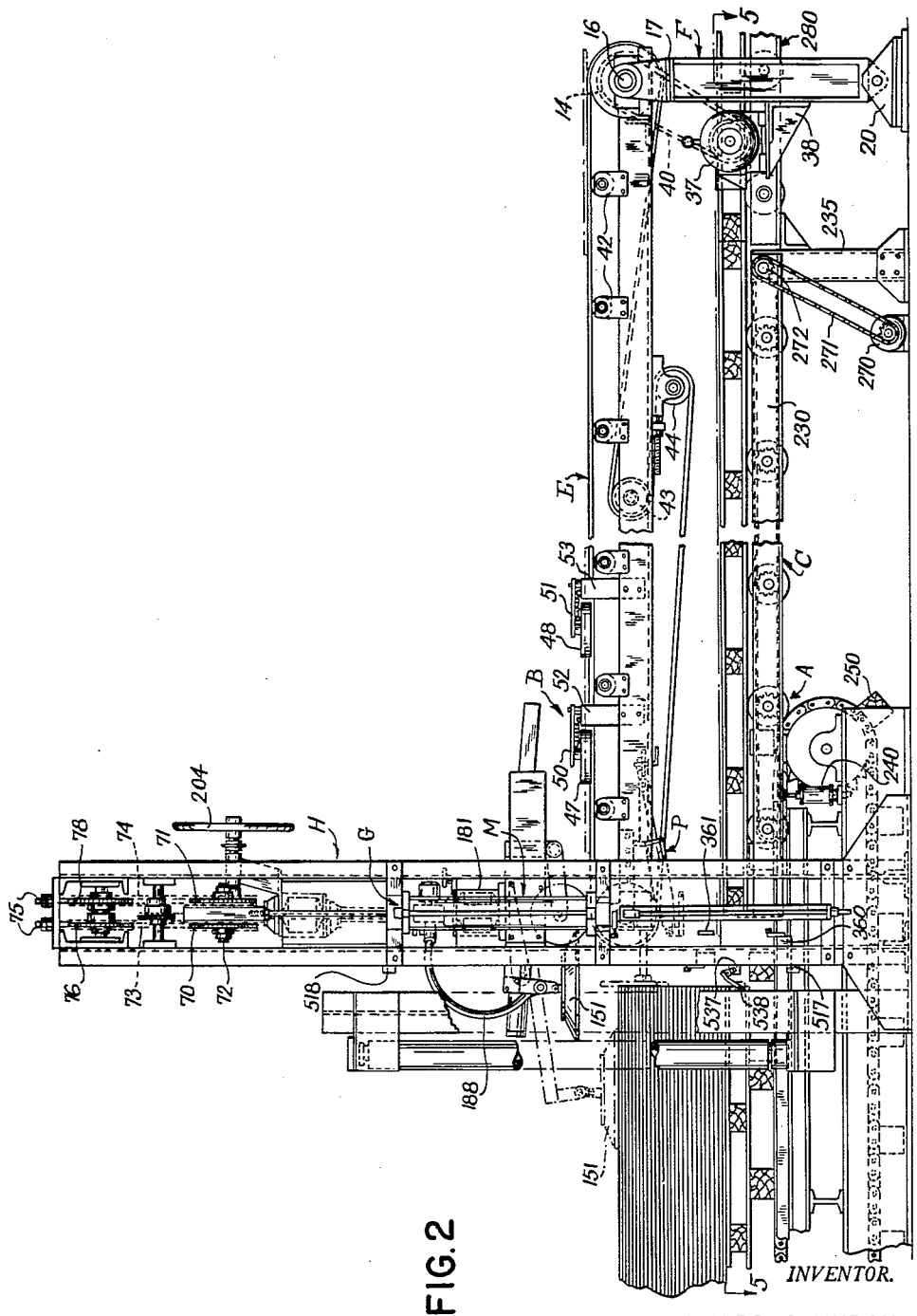
FIG. 2 is a fragmentary side elevational view of the apparatus shown in FIG. 1.

The pallet conveyor D comprises a plurality of members 250 arranged transversely of the direction of travel of the articles and the pallets. The members 250 are suitably spaced relative to one another and have their opposite ends connected and carried by conveyor chains 251 and 252 reeved about pairs of sprocket wheels 254 and 255. Sprocket wheels 254 at the end of the conveyor D adjacent to the tipple frame assembly H are carried by transverse shaft 260 and the sprocket wheels 255 at the other end of the conveyor D are fixed to a similar shaft 261, which shaft is driven by a reversible motor 262. The upper reaches of the chains 251, 252 are supported by structural steel members 264 and 265 forming a part of the frame 133 of the conveyor D. The conveyor D, as can be seen in FIG. 2, extends a short distance under the pallet conveyor C, and the top surface of members 250 which engage the pallets are spaced a slight distance below the surface of the wheels 232 in engagement with a pallet when the pallet conveyor C is in its raised position. The members 250 are also straddled by the rollers 232, that is the rollers 232 on one channel member 230 are positioned on one side of the members 250 and the rollers 232 on the other channel member 230 are positioned on the other side of members 250.

When the air cylinders 240 are energized in the direction to lower the members 230 the wheels 232 of the pallet conveyor C are moved below the members 250 of the conveyor D, as shown in FIG. 6. This movement causes a pallet which is positioned on the left-hand end of the conveyor C to be placed on the members 250 of the conveyor D. The lowering movement of members 230 of conveyor C is sufficiently great to cause the stop members 241 which normally hold the pallets on the conveyor C to move below the members 250 of the conveyor D. Therefore, it is apparent that when conveyor C is lowered the conveyor D receives a pallet and the pallet can be moved by the conveyor D into loading position without interference by stop members 241.

In order to utilize conveyor C to remove pallets which have been unloaded rollers 232 are adapted to be driven in a clockwise direction as viewed in FIG. 2, by a motor 270 connected to the shaft 234 by a sprocket chain drive 271. The shaft 234 drives the stud shafts 231 upon which the rollers 232 are mounted through suitable sprocket chain drives designated generally as 274. Thus, when the motor 270 is running the various rolls 232 can be driven thereby through the magnetic clutches in the hubs of rolls 232, described above, and a pallet placed on the rolls can be conveyed away from the tipple frame assembly H.

During the stacking of articles on pallets the rolls 232 serve as idlers, as above mentioned, and the pallets are fed thereto by a suitable conveyor mechanism 280 driven by an electric motor 281. The first pallet fed onto the idler rollers is pushed along the idler rollers by trailing pallets until the leading end of the first pallet engages the stop members 241 secured to the channel members 230 adjacent the tipple frame assembly H. The pallets rest in this position until the control mechanism of the machine causes the cylinders 240 to function to lower the leading pallet onto the members 250 of the conveyor D which then moves the empty pallet into loading position.

During the unloading of a pallet the air cylinders 240 hold the pallet conveyor C in a lower position, as shown in FIG. 6, and the motor 270 and the magnetic clutches in the hubs of the rollers 232 are energized to cause the rollers 232 of the conveyor C to be rotated. When a pallet has been unloaded the conveyor D is energized to move the empty pallet into engagement with the rotating rollers 232 of the conveyor C, the rollers 232 being powered, will move the empty pallet away from the tipple frame assembly H and onto the conveyor 280.

The interrelationship of the various elements of the mechanism shown will become apparent as well as the complete operation of the machine from a detailed description of the electrical and hydraulic systems which control the operation of the various machine components and which will now be described in connection with the loading and unloading of pallets.

*Stacking or Loading*

Referring to the wiring diagram, the operator to start the loading operation moves the loading-unloading selector switch 305 into its loading position closing contacts 310—311; 312—313; 314—315; and 316—317. The closing of contacts 314—315 and 316—317 of selector switch 305 are in the unstacking or unloading control and perform no function at this time.

The closing of contacts 310—311 of selector switch 305 establishes a circuit from the power line 320 through the now closed contacts 310—311 of selector switch 305, wire 321, normally closed interlock contacts 322 of motor controller 323 for motor 37, wire 324, operating solenoid 325 of motor controller 323 to power line 326. Energization of the operating solenoid 325 of motor controller 323 causes motor 37 to be connected to the power lines in such a manner that it operates in the direction to drive the upper reaches of the valves 10 and 11 towards the left, as viewed in FIG. 2. The motor for driving the conveyor L may be simultaneously started in the correct direction in a similar manner.

The closing of contacts 312—313 of selector switch 305 establishes a circuit from the line 320 through the now closed contacts 312—313, wire 327, normally closed contacts 328 of relay 330, wire 331 and operating solenoid 332 of solenoid valve 111 actuating the valve to open the same. Assuming that the conveyor E is in its lower position, the opening of this valve does not perform any function. If the conveyor E is in any position other than its lower position the opening of valve 111 will cause the conveyor to move to its lower position. The closing of contacts 312—313 of selector switch 305 establishes a second circuit from the wire 327 through normally closed contacts 333—334 of article or stack actuated switch 335, wire 336 and operating solenoid 337 of time delay relay 338 to line 326. Energization of the operating relay 337 of time delay relay 338 actuates the relay to open its normally closed delayed opening instant closing contacts 340. The opening of these contacts does not perform any function at this time.

The closing of contacts 312—313 of selector switch 305 establishes a third circuit from the wire 327 through the operating solenoid 341 of time delay relay 342 to line 326. The energization of the operating solenoid 341 of time delay relay 342 closes its normally open delayed closing contacts 343. Prior to the closing of contacts 343 of time delay relay 342 a fourth circuit is established by the closing of contacts 312—313 from the wire 327 through the now closed contacts 344—345 of a normally closed switch 346 opened by the engagement of the leading end of a board carried along by the belts 10, 11 underneath the wheel 200, wire 347, normally closed contacts 348 of relay 350, wire 351 and operating solenoid 352 of relay 353 to line 326. Energization of the operating solenoid 352 of relay 353 actuates the relay to close its normally open contacts 354, 355. The closing of contacts 354 of relay 353 establishes a circuit from the wire 347 through the now closed contacts 354 of relay 353, wire 356 and operating solenoid 357 of relay 350 to line 326. Energization of the operating solenoid 357 of relay 350 actuates the relay to close its normally open contacts 358 and open its normally closed contacts 348. The closing of normally open contacts 358 of relay 350 establishes a holding circuit for the relay from the wire 347 through the now closed contacts 358 of relay 350, wire 356 and operating solenoid 357 of relay 350 to line 326. The opening of normally closed contacts 348 of relay 350 breaks the circuit for relay 353 allowing the normally open contacts 354, 355 thereof to reopen. Contacts 355 reopen before contacts 343 close.

If the conveyor E is in its down position, tipple actuated switch 360 connected to the right-hand side member 28 of the end frame F and shown in FIG. 2, is closed. The switch is spring biased to open position and is actuated by cam or trip 361 on conveyor E as the conveyor reaches its lower limit to close its normally open contacts 362—363; 364—365. Assuming that the conveyor E is in its down position when the selector switch 305 is turned to stacking or loading position, the closing of contacts 312—313 of selector switch 305 establishes a fifth circuit from the wire 327, now closed contacts 362—363 of tipple actuated switch 360, wire 366 and coil 367 of counter 368 to line 326. This actuates the counter to close its normally open contacts 370, 371 and open its normally closed contacts 372. Any type counter may be employed. The counter shown is an Eagle Microflex Reset Counter manufactured by Eagle Signal Corporation of Moline, Illinois. The closing of normally open contacts 370 of counter 368 establishes a circuit from the wire 327 through normally closed contacts 373—374 of manually operable counter reset push button switch 375, wire 376, now closed contacts 370 of counter 368, wire 366, operating solenoid 367 of counter 368 to line 326. This establishes a holding circuit to continue the counter 368 in operation after the switch 360 opens.

The closing of contacts 371 of counter 368 establishes a circuit from the wire 327 through normally closed contacts 380—381 of manually operable tipple conveyor down push button switch 382, wire 383, now closed contacts 371 of counter 368, wire 384, now closed contacts 314—315 of selector switch 305, wire 385 and operating solenoid 386 of relay 330 to line 326. Relay 330 is thereby energized and its normally open contacts 390, 391, 392 closed and its normally closed contacts 328 opened. The closing of contacts 390 of relay 330 establishes a circuit from the wire 384 through the now closed contacts 390 of relay 330, wire 393 and operating solenoid 394 of solenoid operated main air valve 87, shifting the valve into position to apply air pressure to the top end of the motor N. The normally closed contacts 328 of relay 330 are in series circuit with the operating solenoid 332 of bypass valve 111 and their opening allows the valve to close. The tipple, however, does not move at this time because the valve 107 is closed. Contacts 391 and 392 of relay 330 are in the unloading control and their operation, at this time, performs no function.

The now closed contacts 364—365 of tipple actuated switch 360 establishes a further circuit from the wire 327, through the now closed contacts 364—365 of switch 360, wire 395, operating solenoid 396 of relay 397 to line 326. Energization of the operating solenoid 396 of relay 397 closes its normally open contacts 400, 401. The closing of these contacts does not perform any functions at this time as the contacts 400 are in series circuit with the normally open contacts 402—403 of article or stack actuated switch 335 and contacts 401 are in series circuit with normally open contacts 404—405 of switch 406. Switch 406 has its operating arm in engagement with the top of the levers which carry the wheel 201 and the construction is such that as the wheel is lifted or raised by the article passing underneath the same the switch is actuated to close its normally open contacts 404—405.

As the leading end of the first article being fed by the conveyor E passes underneath the wheels 200, 201 of the conveyor, the wheels are raised a distance equal to the thickness of the article. This actuates the switch 346 to open its normally closed contacts 344—345 and switch 406 to close its normally open contacts 404—405. The opening of contacts 344—345 of switch 346 breaks the previously established holding circuit from the wire 327 through the normally closed contacts 344—345 of switch 346, wire 347, now closed contacts 358 of relay 350, wire 356 and operating solenoid 357 of relay 350 to line 326, thus de-energizing the relay. De-energization of the relay 350 allows its normally open contacts 358 to reopen and its normally closed contacts 348 to reclose. The closing of contacts 348 does not perform any function at this time because they are in series circuit between the wire 328 and the line 326 with the now open contacts 344—345 of switch 346.

The closing of contacts 404—405 of switch 406, by the entrance of the leading end of the article on the conveyor E underneath the wheel 201, establishes a circuit from the wire 327 through the now closed contacts 404—405 of switch 406, wire 410, now closed contacts 401 of relay 397, wire 411 and operating solenoid 412 of valve 413 to line 326. Energization of the solenoid 412 of valve 413 to line 326 shifts the valve to draw air to the top of the cylinders 240 causing the pallet conveyor C to lower and place a pallet on conveyor D. A circuit is simultaneously established from the wire 411 through the now closed interlock contacts 415 of motor controller 419, wire 417 and operating solenoid 418 of motor controller 419 for motor 262 which actuates the conveyor D to line 326. Energization of the operating solenoid 418 of motor controller 419 causes the motor 262 to operate in a direction to move the pallet placed thereon by the conveyor C towards the left, as viewed in the drawings, and in the event there was a previously loaded pallet on the conveyor this pallet is moved away from loading position.

The motor 262 and the conveyor D continues to operate until the trailing edge of the pallet clears the wheel 201 whereupon the normally open contacts 404—405 of switch 406 reopen breaking the circuit for the solenoid 412 of valve 413 which causes the conveyor C to return to its raised position and solenoid 418 of motor controller 419 which stops the motor 262 and in turn the conveyor D.

As the article being fed emerges from the left-hand end of the tipple conveyor E and assumes the position on the pallet on the conveyor D, its back edge, as viewed in the drawings, engages a trip 420 which actuates switch 335 carried by the tipple conveyor to open its normally closed contacts 333—334 and closes its normally open contacts 402—403. The trip 420 is positioned beyond the left-hand end of the tipple conveyor E where it is engaged by articles being discharged onto the stack by the tipple conveyor and by the side of the stack of articles depending upon the position of the discharge end of the tipple conveyor relative to the top of the stack. The opening of normally closed contacts 333—334 of article actuated switch 335 breaks the circuit for time delay relay 338 and after a predetermined time the normally closed contacts 340 thereof close. In the interim, the closing of the normally open contacts 402—403 of article or stack actuated switch 335 established a circuit from wire 327 through the now closed contacts 400 of relay 397, wire 421, now closed contacts 402—403 of article or stack actuated switch 335, wire 422, now closed contacts 316—317 of selector switch 305, wire 423 and operating solenoid 424 of valve 108. Energization of the operating solenoid 424 of valve 108 opens the valve allowing the tipple conveyor E to move in an upwardly direction and in turn the tipple actuated switch 360 to open. The opening of contacts 364—365 of switch 360 breaks the circuit from the wire 327 to the line 326 through the operating solenoid 396 of relay 397 allowing the normally open contacts thereof, 400—401, to reopen.

The opening of contacts 400 places the upward movement of the tipple conveyor under the control of the article or stack operated switch 335 and the delayed closing of contacts 340 of time delay relay 338 which are in series circuit with the normally open contacts 402—403 of switch 335 in a circuit from the wire 327 through the normally closed contacts 425—426 of manually operated normally closed tipple up stop switch 427, wire 428, normally closed contacts 340 of time delay relay 338, wire 421, now closed contacts 402—403 of article or stack actuated switch 335, wire 422, now closed contacts 316—317 of selector switch 305, wire 423 and operating solenoid 424 of valve 108 to line 326. In the interim, between the actuating of the article or stack control switch 335 and the closing of the delayed closed contacts 340 of time delay relay 338, one or more articles, preferably more than one, have been fed by the tipple conveyor E to the stack depending upon the setting of the time delay relay 337 and whether or not a continuous stream of articles is being fed to the tipple conveyor by the conveyor F. The normally closed contacts 402—403 or article or stack control switch 335 are maintained closed by the engagement of its trip 420 with the partially formed stack upon the pallet, and upon the closing of the delayed closed contacts 340 of time delay relay 338 the circuit traced above is established energizing the operating solenoid 424 of the valve 108 and the upward movement of the stack initiated. The tipple conveyor continues to move in an upwardly direction as long as articles are being fed to the stack or until the trip 420 for the switch 335 loses contact with the stack of articles on the pallet, that is, until the trip moves above the top article on the pallet. When this occurs the normally closed contacts 333—334 of stack actuated switch 335 closes and normally closed contacts 402—403 thereof open. The reclosing of contacts 333—334 of switch 335 re-establishes the circuit for the operating solenoid 337 of time delay relay 338 from the wire 327 to the line 326 causing the contacts 340 of time delay relay 333 to instantly open. This, together with the reopening of contacts 402—403 of stack operated switch 335, breaks the circuit for the operating solenoid 424 of valve 108 causing the valve to close stopping the upward movement of the conveyor. Upon the emergence of the next article from the tipple conveyor E and delivery to the top of the stack being formed, the stack operated switch 335 is again actuated and the cycle of operation just described repeated.

Concurrently with the opening of the normally closed contacts 364—365 of tipple actuated switch 360 upon the movement of the tipple from its down position, the normally open contacts 362—363 of switch 360 also open but the opening of these contacts does not perform any function at this time because the circuit for the coil 367 of counter 368 is maintained through the normally open but now closed contacts 370 thereof.

When the trailing end of a board passes out from underneath the wheel 200, the normally closed contacts 344—345 of switch 346 recloses establishing a circuit from the wire 327 through the now closed contacts 344—345 of switch 346, wire 347, normally closed contacts 348 of relay 350, wire 351 and operating solenoid 352 of relay 353 to line 326. Energization of the operating solenoid 352 of relay 353 actuates the relay to close its normally open contacts 354—355. The closing of contacts 354 establishes a circuit from the wire 347 through the now closed contacts 354, wire 356 and operating solenoid 357 of relay 350 actuating the relay to close its normally open contacts 358 and establishing a holding circuit therefor and open its normally closed contacts 348 de-energizing the operating solenoid 352 of relay 353. Prior to the de-energization of the operating solenoid 352 of relay 353, its normally open contacts established a circuit from the wire 327 through the then closed contacts 355 of relay 353, wire 430, now closed contacts 343 of time delay relay 342, wire 431, operating solenoid 432 of time delay relay 433 to line 326. Energization of the operating solenoid 432 of time delay relay 433 actuates the relay to close its normally open instant close delayed open contacts 434 and its normally open contacts 435. The closing of contacts 434 of time delay relay 433 establishes a circuit from the wire 327 through the now closed contacts 434, wire 436 and operating solenoid 437 of valve 438 which controls the flow of pressure fluid to the end and side stacking aligning fluid pressure operated motors 135, 146. The valve 438 is spring biased to a position wherein the motors 135, 146 are normally connected to the source of fluid pressure 88 in such a manner that the motors normally maintain the vertical side aligning roll 132 retracted and the pusher plates 140, 141 retracted. Energization of the solenoid 437 of the valve 438 causes fluid pressure to be applied to the motors 135, 146 in such a manner that the vertical roll 132 is moved towards the two stationary vertical rolls 130, 131 at the opposite side of the stack and the pusher plates 140, 141 are moved a predetermined distance, as previously described, toward the end of the stack adjacent to the tipple. This positions the pallet on the conveyor D and aligns the first article fed thereto on the pallet and the subsequent articles delivered thereto with the article or articles already on the stack, after a predetermined interval depending upon the setting of the time delay relay 433 the delayed open contacts 434 thereof open deenergizing the operating solenoid 437 of valve 438 allowing the valve to return to its normal position. The return of valve 438 to its normal position reverses the direction of flow of fluid to the motors 135, 146 thereby retracting the aligning roll 132 and the pusher plates 140, 141 preparatory for the delivery of a succeeding article to the stack being formed upon the pallet. The valve 438 can be operated at any time by the operator depressing a normally open push button switch 440 to close its normally open contacts 441—442 which are in parallel circuit with the contacts 434 of time delay relay 433 between the wires 327, 436.

The closing of contacts 435 of time delay relay 433 establishes a circuit from the wire 327 through the now closed contacts 435 of time delay relay 433, wire 450 and operating coil 451 of counter 368 to line 326. Energization of the operating coil 451 of counter 368 causes the counter to advance one step thereby counting one article.

The tipple conveyor continues to move up and the other operations described above are repeated as long as articles are delivered to the tipple until a predetermined number of articles have been placed in the stack on the pallet at which time the counter, having counted the desired number of articles causes the now closed contacts 370 of the counter to open thus breaking the holding circuit for the operating coil 367 of the counter and allowing normally open contacts 371 thereof to open and normally closed contacts 372 of the counter to close. The opening of contacts 371 of counter 368 breaks the circuit for relay 330 allowing its normally open contacts 390, 391, 392 to reopen and its normally closed contacts 328 to reclose. The opening of contacts 371 of counter 368 and the opening of contacts 390 of relay 330 breaks the circuit for the operating solenoid 394 of the main air control valve 87 to the motor M thereby allowing the valve to return to its normal position and reverse the direction of flow of air to and from the motor M. Air pressure is then supplied to the lower end of the cylinder 67 of the motor M.

The reclosing of contacts 328 of relay 330 establishes a circuit from the line 327 through the contacts 328, wire 331, operating solenoid 332 of bypass valve 111 to line 326. Energization of the operating solenoid 332 of bypass valve 111 opens the valve so that the hydraulic fluid in the upper end of the cylinder 102 of the control motor N can readily flow to the lower end thereof. From the foregoing it will be apparent that the movable end of the tipple conveyor will be quickly returned to its down position. This downward movement continues until the movable end of the tipple conveyor reaches its down position and the cam or trip 361 thereon actuates limit switch 360. Operation of switch 360 by the cam 361 closes its normally open contacts 362—363, 364—365. The closing of contacts 362—363 establishes a circuit through coil 367 of counter 368 to line 326 as previously described. This closes contacts 370, 371 and opens contacts 372 of the counter and resets the counter so that upon the next operation of the switch 346 by an article passing under the wheel 200, a new count will be started.

The reclosing of contacts 370 of counter 368 reestablishes a holding circuit for counter coil 367 through the normally closed counter reset push button switch 375. The reclosing of contacts 371 of counter 368 reestablished the circuit from the wire 327 through the normally closed push button switch 382 and the operating solenoid 386 of relay 330 to line 326 actuating the relay 330 to reopen its normally closed contacts 328 and to reclose its normally open contacts 390, 391, 392. The reopening of contacts 328 of relay 330 breaks the circuit through the operating solenoid 332 of bypass valve 111 allowing the valve to close and stop the downward movement of the tipple conveyor E. The reclosing of contacts 390 of relay 330 reestablishes the circuit previously described through the operating solenoid 394 of valve 87 shifting the valve to apply pressure fluid to the upper end of the cylinder 63 of the motor M, that is, in the direction to move the conveyor E in an upwardly direction. Contacts 391, 392 are in the destacking or unloading circuit, as previously explained. As the leading end of the first article of the new stack engages underneath the wheels 200, 201, the switches 346, 406 are opened and closed, respectively. The opening of the switches 346 breaks the holding circuit for relay 357 and its normally closed contacts 348 reclose but this does not reenergize the operating solenoid 352 of relay 353 until the trailing edge of the article clears the wheel 200.

The closing of the normally open contacts 404—405 of switch 406 establishes a circuit from the wire 327 through the now closed contacts 404—405 of switch 406, wire 410, and assuming that the conveyor E is in the process of being lowered normally closed contacts 372 of relay 368, wire 411 and operating solenoid 412 of valve 413 to line 326. Simultaneously a circuit is established from the wire 411 through the normally closed contacts 415 of relay 416, wire 417 and operating solenoid 418 of motor controller 419 for conveyor D motor 262 to line 326, thus lowering the conveyor C to place an unloaded pallet on the left-hand end thereof on the right-hand end of the conveyor D and actuating the conveyor D to move the loaded pallet from loading position and the unloaded pallet into loading position, as previously explained.

The length of the article being handled is preferably such that the conveyor E will be completely lowered before an article which engages underneath the wheels 200, 201, as the conveyor is being lowered, passes beyond or from underneath the wheels 200, 201. In this event the conveyor actuated switch 360 will be operated to close its normally open contacts while an article is underneath the wheels 200, 201 and while the loaded pallet is being removed from loading position and an unloaded pallet is being moved into loading position to energize the normally closed contacts 372 of counter 368. The motor 262 for the conveyor D and the motors 240 for the conveyor C are continued in operation, however, by the closing of the normally open contacts 401 of relay 397, which relay was actuated upon the closing of the normally open contacts 364—365 of tipple actuated switch 369 until the article being fed passes from underneath the wheel 201 and the switch 406 opens.

The operation of the apparatus is preferably such that the leading end of the empty pallet being moved into loading position and the leading end of the article being fed thereto follow closely behind the trailing end of the loaded pallet being moved out of loading position, and the speed at which the conveyor moves is preferably the same as the speed of the articles being fed to the empty pallet. The result is that as the article is fed to the empty pallet, it does not skid or slide along the empty pallet but merely drops thereon.

The loading of the empty pallet moving into loaded position continues as already described. If desired, some suitable and conventional control mechanism, not shown, can be utilized to interrupt the feeding of articles by conveyor E in the event no pallet moves into loading position when the conveyors C, D are actuated, as previously explained. Such a control might comprise a pallet actuated switch in the control circuit for motors 9, 37 which drive the conveyors L, E, respectively.

The end of the conveyor C, adjacent to the conveyor D, can be lowered at any time by the operator and the conveyor D simultaneously actuated in a direction to move an empty pallet into loading position by the operator depressing a manually operable and normally open push button switch 455 to close its normally open contacts 456—457 to complete a circuit between the wires 327, 411.

The tipple conveyor also can be moved in an upwardly direction by the operator depressing a normally open push button switch 460 to close its normally open contacts 461—462 and 463—464. This might be desirable, for example, assuming the upward movement of the tipple fell behind the top of the stack being formed.

The operator can interrupt or stop the downward movement of the tipple conveyor E at any time by depressing the normally closed push button switch 382 to open its normally closed contacts 380—381.

The operator can also interrupt or prevent the upward movement of the tipple upon the actuation of the stack or article actuated switch 335 to close its normally open contacts 402—403 by depressing the tipple up stop push button switch 427 to open its normally closed contacts 425—426.

The stacking operation can be interrupted at any time before the counter has completed its count by the operator depressing the counter reset push button switch 375 to open its normally closed contacts 373—374 which are in series circuit with the holding contacts 370 of the counter 368.

*Destacking or Unloading*

When the two position selector switch 305 is moved to its destacking or unloading positon its contacts 310, 500; 312, 501; 315, 502; and 317, 503 close. The closing of contacts 310, 500 of selector switch 305 establishes a circuit from a power line 320 through the now closed contacts 310, 500 of selector switch 305, wire 504, normally closed interlock contacts 505 of the motor controller 323 for the motor 37, wire 506, operating solenoid 507 of motor controller for motor 37 to power line 326. Energization of the operating solenoid 507 of the motor controller 323 causes the motor 37 to be connected to the power lines in such a manner that it operates in the direction to drive the upper reaches of the belts 10, 11 towards the right as viewed in FIG. 2.

When the contacts 312, 501 of the selector switch 305 are closed they establish a circuit from the line 320 through the now closed contacts 312, 501, wire 510, now closed contacts 511, 512 of toggle switch 513, wire 514 and operating solenoid 515 of relay 516 to line 326. The toggle switch 513 is carried by the tipple conveyor and is operated by adjustable trips 517, 518 carried by the end frame H as the tipple conveyor reaches its lower and upper limits of travel. The energization of operating solenoid 515 of relay 516, closes its normally open contacts 515, 526, 527. The closing of contacts 525 establishes a circuit from the wire 510, contacts 525 of relay 516 which are now closed, wire 530, contacts 502, 315 of selector switch 305, wire 385 and operating solenoid 386 of relay 339. Energization of the operating solenoid 386 of relay 330 actuates the relay to close its normally open contacts 390, 391, 392 and open its normally closed contacts 328.

The closing of normally open contacts 391 establishes a circuit for the operating solenoid 332 of bypass valve 111 from the wire 510 through the now closed contacts 391, wire 331 and solenoid 332 to line 326. This opens the bypass valve 111 allowing the hydraulic fluid in the control cylinder 102 to flow freely from one end to the other. The closing of normally open contacts 392 of relay 330 establishes a circuit from the wire 510 through the now closed contacts 392 of relay 330, wire 393 and solenoid 394 of main control valve 87 actuating the valve to apply air pressure to the top of the cylinder of motor M causing the tipple conveyor to quickly rise to its up position.

When the tipple conveyor E reaches the upper limit of its travel the toggle switch 513 will be operated to open its contacts 511, 512 and close its contacts 531, 532. The circuit to relay 516, however, will not be thereby interrupted unless a stack of articles on a pallet has been positioned for unloading because of the establishment of a holding circuit for the relay upon the closing of its normally open contacts 526 from the wire 510 through now closed contacts 535, 536 of a stack operated switch 537 carried by the tipple frame and opened by a loaded pallet being positioned for unloading and engaging actuator 538 of switch 537, wire 538 and previously closed contacts 526 of relay 516 to wire 514 connected to relay 516.

The closing of contacts 531, 532 of toggle switch 513 upon the tipple conveyor E reaching its up position establishes a circuit from the wire 510 through the now closed contacts 531, 532 of toggle switch 513, wire 540, now closed contacts 527 of relay 516, wire 541 and operating solenoid 542 of relay 543 to line 326. Energization of the operating solenoid 542 of relay 543 closes its normally open contacts 544. The closing of contacts 544 establishes a circuit from the line 510 through the now closed contacts 544 of relay 543, wire 546, normally closed interlock contacts 547 of motor controller 419, wire 548, and operating solenoid 549 of motor controller 419 for motor 262 to line 326. Energization of the operating solenoid 549 of motor controller 419 causes the motor 262 to rotate in a direction to cause the conveyor D to move from left to right, as viewed in FIG. 1 that is, in a direction to move a loaded pallet into unloading position. Simultaneously the interlock contacts 415 of controller 419 are actuated to prevent possible operation of the motor in the reverse direction. Subsequent to the opening of interlock contacts 415 of motor controller 419, normally open contacts 550 thereof close. The closing of contacts 550 of motor controller 419 establishes a circuit from line 510 through now closed contacts 550 of motor controller 419, wire 411 and operating solenoid 412 of valve 413. Energization of solenoid 412 actuates the valve 413 to cause the cylinders 240 to lower pallet conveyor C. Since interlock contacts 415 of motor controller 419 are open a circuit is not completed through operating solenoid 418 of motor controller 419. The closing of contacts 544 of relay 543 also completed a circuit through wire 551, and operating solenoid 552 of motor controller 553 to line 326. Energization of operating solenoid 552 causes motor 270 of pallet conveyor C to operate. Another circuit is also completed through contacts 544 of relay 543, wire 551, and operating coil 554 of relay 555 to line 326. Energization of relay 555 causes the magnetic clutches in the hubs of wheels 232 to be engaged. Since conveyor D is now operating from left to right as viewed in the drawing, pallet conveyor C is in its low position as shown in FIG. 6, and rollers 232 are being driven, any empty pallet which had previously been unloaded is conveyed by conveyor D onto conveyor C and the rollers 232 carry the pallet from the apparatus as a loaded pallet is conveyed by conveyor D into unloading position.

Upon the loaded pallet reaching the unloading position the stack operated switch 537, carried by the tipple frame, is actuated to open its contacts 535, 536 and close its contacts 556, 557. The opening of contacts 535, 536 of stack operated switch 537 breaks the holding circuit for relay 516 allowing its contacts 525, 526, 527 to reopen. The opening of contacts 525 breaks the circuit for relay 330 allowing its contacts 391 to open, de-energizing the operating solenoid 332 for valve 111 closing the bypass circuit around the motor N. The opening of contacts 526 of relay 516 performs no function at this time, however, the opening of contacts 527 breaks the circuit to relay 543, de-energizing the relay 543 and causing its contacts 544 to open. The opening of contacts 544 of relay 543 breaks the circuit for the operating solenoid 549 of motor controller 419, operating solenoid 412 for fluid motors 240, operating solenoid 552 of motor controller 553, and operating solenoid 554 of relay 555. The motor 262 for conveyor D is thereby stopped, the motor 270 for rollers 232 is stopped and the magnetic clutches controlled by relay 555 are disengaged, and the conveyor C is raised to its up position.

The closing of contacts 556, 557 of switch 537 by a loaded pallet moving into unloading position establishes a circuit from the wire 510 through contacts 555, 556 which are now closed, wire 558 and operating solenoid 559 of the controller for the motor 189 which runs the vacuum pump 186. The vacuum pump will continue to operate as long as an article remains on the pallet being unloaded.

The supply of pressure fluid to the motor 182 for projecting and retracting the carriage which projects and lowers the vacuum cups 150, 151 and retracts and raises them, and the downward movement of the left-hand end of the tipple conveyor E are under the control of a stack operated switch 570 having normally open contacts 571, 572 and normally closed contacts 573, 574. The switch 570 is carried by the tipple conveyor and is operated by the actuator 420 which projects to the left of the tipple conveyor proper into a position where it can engage the far side of a stack on a pallet on the conveyor D.

As the tipple conveyor reaches the top of its travel or alternatively when a loaded pallet is moved into unloading position with the tipple conveyor in its up position relay 516 is de-energized. This allows normally open contacts 525 of relay 516 to open de-energizing relay 330 and in turn the operating solenoid 394 for the main air supply valve 87 causing the valve to reverse and air pressure to be applied to the motor M in the direction to move the tipple conveyor E down. The tipple conveyor moves down because the operating solenoid 424 of the control valve 108 for the stop check valve 107 was energized upon the closing of contacts 312, 501 of selector switch 305 from the wire 510 through the normally closed contacts 573, 574 of stack actuated switch 570, wire 576, closed contacts 593, 317 of selector switch 305, wire 423 and operating solenoid 424 of control valve 108. The downward movement of the tipple conveyor continues until the stack operated switch 570 is actuated to open its contacts 573, 574 and break the circuit for the solenoid 424 of the control valve 108. This allows the stop check valve 107 to close and stop the downward movement of the tipple conveyor. Simultaneously with the opening of contacts 573, 574 of stack operated switch 570 the previously open contacts 571, 572 thereof close.

The closing of contacts 571, 572 of stack operated switch 570 establishes a circuit from the wire 510 through the now closed contacts 571, 572, wire 580, normally closed contacts 581, 582 of switch 583, wire 584, operating solenoid 585 of timing relay 586 to line 326. The energization of the operating solenoid 585 of relay 586 closes its normally open instant close, delayed opening contacts 587, establishing a circuit from the wire 510 through the now closed contacts 587 of relay 586, wire 590, normally closed contacts 591, 592 of switch 593, wire 595 and operating solenoid 596, of a two position two-way valve 597 to line 326. The valve 597 controls the flow of fluid pressure to the motor 182 which actuates the carriage to which the vacuum cups 150, 151 are attached and the energization of the operating solenoid 596 of the valve 597 shifts the valve so as to connect the right-hand end of the motor with the air supply thus causing the motor to extend the arms 162, 163 of the carriage and allow the same to drop so as to position the vacuum cups 150, 151 in contact with the top article of the stack of articles being unstacked.

The switch 593 is carried by the carriage which carries the vacuum cups and as the carriage reaches the left-hand end of its movement a trip 598 on the bracket 172 opens the previously closed contacts 591, 592 of toggle switch 593 thus de-energizing the operating solenoid 596 of the valve 597 allowing the valve to return to its normal position, to which position it is spring biased, and in which position the direction of the flow of air to and from the motor 182 is reversed thus causing the vacuum cups 150, 151 to be retracted.

When the carriage is retracted the vacuum cups 150, 151 carry the end of the top article on the stack adjacent to the tipple upwardly and to the right until the right-hand end thereof engages underneath the wheels 200, 201. When this occurs the lifting of the wheels 200, 201 opens the switch 583 thus preventing a further operation of the carriage which carries the vacuum cups 150, 151 until the article which is pressed against the belts 10, 11 by the wheel has been drawn from the stack and moved beyond the wheels. As the article is engaged underneath the wheels 200, 201, the cam 193 on the far arm 162 raised the rod 192 opening the valve 191 and breaking the vacuum for the vacuum cups 150, 151 allowing them to release the article. The carriage which carries the vacuum cups returns to its right-hand position and a trip 599 on the bracket 172 recloses the toggle switch 593. Final delay relay 586 assures complete extension of the arms 162, 163 which carry the vacuum cups 150, 151 in the event the switch 570 is actuated to open its contacts 571, 572 before the arms are wholly extended.

As successive articles are removed from the pallet the stack will be lowered and the stack operated switch 570 reoperated, but in this event the contacts 571, 572 thereof are opened and the contacts 573, 574 are closed. The reopening of the contacts 571, 572 prevents subsequent operation of the motor 182 until the tipple has dropped sufficient to permit these contacts to again close. The closing of the contacts 573, 574 of stack operated switch 570 re-energizes the operating solenoid 424 of the control valve 108 and shifts the valve to cause the stop check valve 107 to reopen thus allowing the tipple conveyor to move in a downwardly direction. The destacking operation will continue until the tipple reaches its bottom position, when contacts 511, 512 of switch 513 are closed, energizing relay 516 and repeating the above described operation. If it is desired to have the movement of the unloaded pallet out of destacking position and the succeeding loaded pallet into stacking position commence concurrently with the upward movement of the tipple conveyor E, contacts 544 of relay 543 can be transferred to relay 516.

At any time during the unloading operation the operator can return the tipple to its up position by depressing the up push button switch 670 to close its normally open contacts 671, 672, thereby establishing a circuit for the relay 330 from the wire 510 through the switch 670, wire 530, now closed contacts 315, 502 of selector switch 305, wire 385, operating solenoid 386 of relay 330 to line 326. The energization of the operating solenoid 386 of relay 330 closes its normally open contacts 392 establishing a circuit from the wire 510 and the wire 393 through the operating solenoid 394 of the main control valve 87 thereby shifting the valve to reverse direction of the flow of air to the main motor M. Simultaneously with the closing of contact 392 of relay 330, the contacts 391 thereof close, energizing the circuit for the operating solenoid 332 of the bypass valve 111 thereby allowing the bypass valve 111 to open whereupon the tipple conveyor moves upwardly at a rapid rate. The tipple conveyor can be moved downwardly by the operator by depressing the down push button switch 673 to close its normally open contacts 674, 675 which are in parallel circuit with the contacts 573, 574 of the stack operated switch 570 between the wires 510 and 576. The operator can actuate the conveyors C, D at any desired time to move pallets therealong toward the right by depressing push button switch 680 to close its normally open contacts 681—682.

It is to be understood that the present invention, while illustrated on the drawings as handling boards, can be used for handling other articles. While the preferred embodiment of the invention has been shown and described in considerable detail, it is also to be understood that the invention is not limited to the particular construction or arrangements of parts shown and described, and other forms, adaptations, and constructions could be employed which fall within the scope of the appended claims Having described my invention, I claim:

1. In equipment for handling sheet material, conveyor means for conveying sheets therealong and having an entrance end, first means for supporting a stack of sheets adjacent to said entrance end of said conveyor means, second means for picking up the top sheet of a stack of sheets on said first means and transferring it to said conveyor means, power means for effecting relative movement between said first means and said entrance end of said conveyor means in a generally vertical direction in timed relation to the decrease in the height of the stack of sheets supported by said first means, and third means actuated by the presence of a sheet on said first means and operative upon positioning of said entrance end of said conveyor adjacent the top of said stack for controlling actuation of said second means.

2. In equipment for handling sheet material, conveyor means for conveying sheets therealong and having an entrance end, first means for supporting a stack of sheets adjacent to said entrance end of said conveyor means, second means for picking up the top sheet of a stack of sheets on said first means and transferring it to said conveyor means, power means for effecting relative movement between said first means and said entrance end of said conveyor means in a generally vertical direction in timed relation to the decrease in the height of the stack of sheets supported by said first means, and third means actuated by the presence of a sheet on said first means and the presence of said entrance end of said conveyor adjacent the top of said stack for controlling actuation of said second means.

3. In equipment for stacking or unstacking material in the form of rigid or semi-rigid sheets, conveyor means having an entrance end and a discharge end, first means for supporting a stack of sheets adjacent to one of said ends of said conveyor means, first power means for producing relative movement in a generally vertical direction between said one end of said conveyor means and said first means, second means including a first member adapted to sense the upper portion of a stack of sheets on said first means for controlling the actuation of said first power means to maintain a predetermined relationship between said one end of said conveyor means and the top of a stack of sheets on said first means, a second member adapted to contact sheets being handled, second power means for moving said second member, and third means including a third member for sensing the passing of a sheet past a predetermined point of said conveyor means for controlling actuation of said second power means.

4. In equipment for stacking or unstacking material in the form of rigid or semi-rigid sheets, conveyor means having an entrance end and a discharge end, first means for supporting a stack of sheets adjacent to one of said ends of said conveyor means, first power means for moving said one end of said conveyor means in a generally vertical direction relative to said first means, second means including a first member adapted to engage the upper portion of a stack of sheets on said first means for controlling the actuation of said first power means to maintain a predetermined relationship between said one end of said conveyor means and the top of a stack of sheets on said first means, a second member adapted to contact sheets being handled, second power means for moving said second member, and third means including a third member for sensing the passing of a sheet past a predetermined point of said conveyor means for controlling actuation of said second power means.

5. In equipment for handling material in the form of rigid or semi-rigid sheets, conveyor means having an entrance end and a discharge end, first means for supporting a stack of sheets adjacent to said discharge end of said conveyor means, first power means for producing relative movement in a generally vertical direction between said discharge end of said conveyor means and said first means, second means including a first member adapted to sense the upper portion of a stack of sheets on said first means for controlling the actuation of said first power means to maintain a predetermined relationship between said discharge end of said conveyor means and the top of a stack of sheets on said first means, a second member adapted to align sheets delivered by said conveyor means to said first means, second power means for moving said second member, and third means for controlling actuation of said second power means in timed relation to the transfer of sheets from said conveyor means to said first means.

6. In equipment for handling material in the form of rigid or semi-rigid sheets, conveyor means having an entrance end and a discharge end, first means for supporting a stack of sheets adjacent to said discharge end of said conveyor means, first power means for moving said discharge end of said conveyor means in a generally vertical direction relative to said first means, second means including a first member adapted to engage the upper portion of a stack of sheets on said first means for controlling the actuation of said first power means to maintain a predetermined relationship between said discharge end of said conveyor means and the top of a stack of sheets supported on said first means, a second member adapted to align sheets delivered by said conveyor means to said first means, second power means for moving said second member, and third means including a third member for sensing the passing of a sheet past a predetermined point on said conveyor means for controlling actuation of said second power means in timed relation to the passing of a sheet past a predetermined point on said conveyor means.

7. In equipment for handling material in the form of rigid or semi-rigid sheets, conveyor means having an entrance end and a discharge end, first means for supporting a stack of sheets adjacent to said entrance end of said conveyor means, first power means for producing relative movement in a generally vertical direction between said entrance end of said conveyor means and said first means, second means including a first member adapted to sense the upper portion of a stack of sheets on said first means for controlling the actuation of said first power means to maintain a predetermined relationship between said entrance end of said conveyor means and the top of a stack of sheets on said first means, third means for picking up the top sheet of a stack of sheets on said first means and transferring it to said conveyor means, and fourth means for controlling actuation of said third means in timed relation to the passing of a sheet past a predetermined point on said conveyor means.

8. In equipment for handling material in the form of rigid or semi-rigid sheets, conveyor means having an entrance end and a discharge end, first means for supporting a stack of sheets adjacent to one said entrance end of said conveyor means, first power means for moving said entrance end of said conveyor means in a generally vertical direction relative to said first means, second means including a first member adapted to engage the upper portion of a stack of sheets on said first means for controlling the actuation of said first power means to maintain a predetermined relationship between said entrance end of said conveyor means and the top of a stack of sheets on said first means, third means for picking up the top sheet of a stack of sheets on said first means and transferring it to said conveyor means, and fourth means for controlling actuation of said second means in timed relation to the passing of a sheet past a predetermined point on said conveyor means.

9. In equipment for handling material in the form of rigid or semi-rigid sheets, conveyor means having an entrance end and a discharge end, first means for supporting a stack of sheets adjacent to said entrance end of said conveyor means, first power means for producing relative movement in a generally vertical direction between said entrance end of said conveyor means and said first means, second means including a first member adapted to sense the upper portion of a stack of sheets on said first means for controlling the actuation of said first power means to maintain a predetermined relationship between said entrance end of said conveyor means and the top of a stack of sheets on said first means, third means for picking up the top sheet of a stack of sheets on said first means and transferring it to said conveyor means, fourth means for controlling actuation of said third means in timed relation to the passing of a sheet past a predetermined point on said conveyor means and fifth means for preventing operation of said third means unless said entrance end of said conveyor means is within said predetermined relationship with the top of a stack of sheets on said first means.

10. In equipment for handling material in the form of sheets, first conveyor means for feeding sheets and having a discharge end, second conveyor means for supporting a stack of sheets adjacent to said discharge end of said first conveyor means, first means for actuating said first conveyor to feed sheets toward said second conveyor means and to direct said sheets onto said second conveyor means thereby forming a stack of sheets on said second conveyor means, second means for raising said discharge end of said first conveyor means as said stack increases in height, third means for counting sheets delivered to said second conveyor means, fourth means actuated by said third means to lower said discharge end of said first conveyor means to a position adjacent to said first means after a predetermined number of sheets has been delivered to said second conveyor means and to actuate said second conveyor means to move the stack of sheets thereon away from said discharge end of said first conveyor means, and fifth means actuated upon said discharge end of said first conveyor means reaching a position adjacent to said second conveyor means for resetting said third means and for stopping the movement of said second conveyor means carrying the stack of sheets thereon away from said discharge end of said first conveyor means.

11. In equipment for handling material in the form of sheets, first conveyor means for feeding sheets and having a discharge end, second conveyor means for supporting a stack of sheets adjacent to said discharge end of said first conveyor means, first means for actuating said first conveyor to feed sheets toward said second conveyor means and to direct said sheets onto said second conveyor means thereby forming a stack of sheets on said second conveyor means, second means for raising said discharge end of said first conveyor means as said stack increases in height, third means for counting sheets delivered to said second conveyor means, fourth means actuated by said third means to lower said discharge end of said first conveyor means to a position adjacent to said first means after a predetermined number of sheets has been delivered to said second conveyor means and to actuate said second conveyor means to move the stack of sheets thereon away from said discharge end of said first conveyor means, fifth means actuated upon said discharge end of said first conveyor means reaching a position adjacent to said second conveyor means for resetting said third means and for stopping the movement of said second conveyor means carrying the stack of sheets thereon away from said discharge end of said first conveyor means, and sixth means for actuating said second conveyor means while a succeeding sheet is being conveyed by said first conveyor means past a predetermined point thereof.

12. In equipment for stacking and unstacking material in the form of rigid or semi-rigid sheets, first conveyor means, first power means for operating said conveyor means to move material thereon in one direction or the other, second conveyor means having one end adjacent to one end of said first conveyor means, second power means for operating said second conveyor means to move material thereon in one direction or the other, third power means for producing relative movement in a general vertical direction between said one of said end of said first conveyor means and said second conveyor means, first means including a first member adapted to sense the upper portion of a stack of sheets on said second conveyor means for controlling the actuation of said first power means to maintain a predetermined relationship between said one end of said first conveyor means and the top of a stack of sheets on said second conveyor means; a second member adapted to align sheets delivered by said first conveyor means to said second conveyor means, fourth power means for actuating said second member, second means including a third member for picking up the top sheet of a stack of sheets on said second conveyor means and transporting it to said first conveyor means, fifth power means for actuating said third member, and a selective control system for stacking or unstacking operation of the equipment and operatively connected to said power means and responsive when stacking is selected to actuate said first power means to operate said first conveyor means in a direction to move material thereon towards said second conveyor means and to actuate said fourth power means for moving said aligning member in predetermined relation to the transfer of sheets from said first conveyor means to said second conveyor means, and when unstacking is selected to actuate said first power means to operate said first conveyor means in a direction to move material thereon away from said second conveyor means and to actuate said fifth power means to pick up the top sheet of a stack of sheets on said second conveyor means and transfer it to said first conveyor means in timed relation to the passing of a sheet on said first conveyor means past a predetermined point thereon.

13. In equipment for handling material in the form of sheets, conveyor means having a discharge end, power means for moving said discharge end of said conveyor means in a generally vertical direction, first means for supporting a stack of sheets adjacent to said discharge end of said conveyor means, second means including a first member adapted to engage the upper portion of said stack of sheets supported by said first means for controlling the operation of said power means to raise said discharge end of said conveyor means as sheets are delivered to said stack, third means for operatively connecting said first member to said conveyor means for movement with said discharge end of said conveyor means, fourth means for aligning sheets of material delivered by said conveyor means to said first means, fifth means for actuating said fourth means in timed relation to the delivery of sheets from said conveyor means to said first means, sixth means for counting sheets delivered by said conveyor means to said first means, and seventh means actuated by said sixth means to lower said discharge end of said conveyor means to a position adjacent to said first means after a predetermined number of sheets have been positioned on said first means.

14. In equipment for handling material in the form of sheets, first conveyor means for feeding sheets and having a discharge end, second conveyor means for supporting a stack of sheets adjacent to said discharge end of said first conveyor means, first means for actuating said first conveyor to feed sheets toward said second conveyor means and to direct said sheets onto said second conveyor means thereby forming a stack of sheets on said second conveyor means, second means for raising said discharge end of said first conveyor means as said stack increases in height, third means for lowering said discharge end of said first conveyor means after a plurality of sheets has been delivered to said second conveyor means and for actuating said second conveyor means to move a stack of sheets thereon away from said discharge end of said first conveyor means in the same direction in which sheets are fed to said second conveyor means.

15. In equipment for handling articles, article conveyor means, means for moving at least one of said article conveyor means in a first generally vertical direction, pallet conveyor means adapted to transfer a pallet into and out of a position adjacent to said one end of said article conveyor means, means for sensing the upper portion of a stack of articles on a pallet in said position adjacent to said one end of said article conveyor means, means responsive to said sensing means for moving said one end of said article conveyor means in a second generally vertical direction opposite to said first generally vertical direction to maintain a predetermined relationship between said one end of said article conveyor means and the top of a stack of articles on a pallet in said position adjacent to said one end of said article conveyor means, a member adapted to contact articles being handled, power means for moving said member, means for sensing the passing of an article past a predetermined point of said article conveyor means for controlling actuation of said power means, and means for actuating said pallet conveyor means to move a pallet into said position adjacent to said one end of said article conveyor means.

16. In equipment for handling articles, article conveyor means, means for moving at least one of said article conveyor means in a first generally vertical direction, pallet conveyor means adapted to transfer a pallet into and out of a position adjacent to said one end of said article conveyor means, means for sensing the upper portion of a stack of articles on a pallet in said position adjacent to said one end of said article conveyor means, means responsive to said sensing means for moving said one end of said article conveyor means in a second generally vertical direction opposite to said first generally vertical direction to maintain a predetermined relationship between said one end of said article conveyor means and the top of a stack of articles on a pallet in said position adjacent to said one end of said article conveyor means, a member adapted to contact articles being handled, power means for moving said member, means for sensing the passing of an article past a predetermined point of said article conveyor means for controlling actuation of said power means, and means for actuating said pallet conveying means to move a pallet into said position adjacent to said one end of said article conveyor means in timed relation to the movement of said one end of said article conveyor means in said first generally vertical direction.

17. In equipment for handling articles, article conveyor means, means for moving at least one of said article conveyor means in a first generally vertical direction, pallet conveyor means adapted to transfer a pallet into and out of a position adjacent to said one end of said article conveyor means, means for sensing the upper portion of a stack of articles on a pallet in said position adjacent to said one end of said article conveyor means, means responsive to said sensing means for moving said one end of said article conveyor means in a second generally vertical direction opposite to said first generally vertical direction to maintain a predetermined relationship between said one end of said article conveyor means and the top of a stack of articles on a pallet in said position adjacent to said one end of said article conveyor means, a member adapted to contact articles being handled, power means for moving said member, means for sensing the passing of an article past a predetermined point of said article conveyor means for controlling actuation of said power means, and means for actuating said pallet conveyor means to move a pallet out of said position adjacent to said one end of said article conveyor means.

18. In equipment for handling articles, article conveyor means, means for moving at least one of said article conveyor means in a first generally vertical direction, pallet conveyor means adapted to transfer a pallet into and out of a position adjacent to said one end of said article conveyor means, means for sensing the upper portion of a stack of articles on a pallet in said position adjacent to said one end of said article conveyor means, means responsive to said sensing means for moving said one end of said article conveyor means in a second generally vertical direction opposite to said first generally vertical direction to maintain a predetermined relationship between said one end of said article conveyor means and the top of a stack of articles on a pallet in said position adjacent to said one end of said article conveyor means, a member adapted to contact articles being handled, power means for moving said member, means for sensing the passing of an article past a predetermined point of said article conveyor means for controlling actuation of said power means, and means for actuating said pallet conveyor means to move a pallet out of said position adjacent to said one end of said article conveyor means in timed relation to the movement of said one end of said article conveyor means in said first generally vertical direction.

19. In equipment for handling articles, article conveyor means, means for moving at least one of said article conveyor means in a first generally vertical direction, pallet conveyor means adapted to transfer a pallet into and out of a position adjacent to said one end of said article conveyor means, means for sensing the upper portion of a stack of articles on a pallet in said position adjacent to said one end of said article conveyor means, means responsive to said sensing means for moving said one end of said article conveyor means in a second generally vertical direction opposite to said first generally vertical direction to maintain a predetermined relationship between said one end of said article conveyor means and the top of a stack of articles on a pallet in said position adjacent said one end of said article conveyor means, a member adapted to contact articles being handled, power means for moving said member, means for sensing the passing of an article past a predetermined point of said article conveyor means for controlling actuation of said power means, and means for actuating said pallet conveyor means to move a pallet out of and another pallet into said position adjacent to said one end of said article conveyor means.

20. In equipment for handling articles, article conveyor means, means for moving at least one of said article conveyor means in a first generally vertical direction, pallet conveyor means adapted to transfer a pallet into and out of a stationary position adjacent to said one end of said article conveyor means, means for sensing the upper portion of a stack of articles on a pallet in said position adjacent to said one end of said article conveyor means, means responsive to said sensing means for moving said one end of said article conveyor means in a second generally vertical direction opposite to said first generally vertical direction to maintain a predetermined relationship between said one end of said article conveyor means and the top of a stack of articles on a pallet in said position adjacent to said one end of said article conveyor means, a member adapted to contact articles being handled, power means for moving said member, means for sensing the passing of an article past a predetermined point of said article conveyor means for controlling actuation of said power means, and means for actuating said pallet conveyor means to move a pallet out of and another pallet into said position adjacent to said one end of said article conveyor means in timed relation to the movement of said one end of said article conveyor means in said first generally vertical direction.

References Cited in the file of this patent

UNITED STATES PATENTS

| | | |
|---|---|---|
| 1,141,277 | Smith | June 1, 1915 |
| 1,511,060 | Miller | Oct. 7, 1924 |
| 2,251,667 | Ehinger | Aug. 5, 1941 |
| 2,875,907 | Locke | Mar. 3, 1959 |
| 2,977,002 | Asp | Mar. 28, 1961 |
| 3,030,107 | Studwill | Apr. 17, 1962 |